US010169571B1

(12) United States Patent
Attfield et al.

(10) Patent No.: US 10,169,571 B1
(45) Date of Patent: Jan. 1, 2019

(54) SYSTEM AND METHOD FOR SECURE, POLICY-BASED ACCESS CONTROL FOR MOBILE COMPUTING DEVICES

(71) Applicant: Sequitur Labs, Inc., Issaquah, WA (US)

(72) Inventors: Philip Attfield, Fall City, WA (US); Paul Chenard, Corvallis, OR (US); Simon Curry, Chelmsford, MA (US); Vincent Ting, Vancouver (CA); Michael Thomas Hendrick, Renton, WA (US); Julia Narvaez, Tacoma, WA (US); Mark Reed, Redmond, WA (US); Daniel Schaffner, Seattle, WA (US); Robert Komar, Vancouver (CA)

(73) Assignee: Sequitur Labs, Inc., Fall City, WA (US)

( * ) Notice: Subject to any disclaimer, the term of this patent is extended or adjusted under 35 U.S.C. 154(b) by 75 days.

(21) Appl. No.: 13/945,677

(22) Filed: Jul. 18, 2013

Related U.S. Application Data

(60) Provisional application No. 61/673,220, filed on Jul. 18, 2012, provisional application No. 61/816,643, filed on Apr. 26, 2013.

(51) Int. Cl.
G06F 21/50 (2013.01)
H04L 29/06 (2006.01)

(52) U.S. Cl.
CPC .......... G06F 21/50 (2013.01); H04L 63/0272 (2013.01)

(58) Field of Classification Search
None
See application file for complete search history.

(56) References Cited

U.S. PATENT DOCUMENTS

| 5,881,225 | A | 3/1999 | Worth |
| 7,140,035 | B1 | 11/2006 | Karch |
| 7,246,233 | B2 | 7/2007 | Brabson et al. |
| 7,640,429 | B2 | 12/2009 | Huang et al. |
| 8,127,982 | B1 | 3/2012 | Casey et al. |
| 8,285,249 | B2 | 10/2012 | Baker et al. |
| 8,321,498 | B2 * | 11/2012 | Maes ........................... 709/203 |
| 8,463,819 | B2 | 6/2013 | Shashikumar et al. |
| 8,468,586 | B2 | 6/2013 | Koottayi et al. |
| 8,904,483 | B1 * | 12/2014 | Martini ........................... 726/2 |
| 2002/0101826 | A1 * | 8/2002 | Giacopelli et al. ........... 370/252 |
| 2004/0204949 | A1 * | 10/2004 | Shaji .................. G06F 11/1415 717/174 |
| 2009/0089125 | A1 | 4/2009 | Sultan |
| 2009/0205016 | A1 | 8/2009 | Milas |
| 2010/0199325 | A1 * | 8/2010 | Raleigh .................. G06F 21/53 726/3 |

(Continued)

OTHER PUBLICATIONS

"Computer Architecture: A Quantitative Approach", Hennessy J. and Patterson, D., 5th Ed. Morgan Kaufman (2011).

(Continued)

Primary Examiner — Kaveh Abrishamkar
(74) Attorney, Agent, or Firm — JRG Attorneys at Law

(57) ABSTRACT

Systems and methods for secure, policy-based, access control and management of mobile computing devices, including policy decision enforcement mechanisms, device and private network presence testing, aspects of file system controls, policy set sanity checking algorithms, performance optimizations.

9 Claims, 15 Drawing Sheets

(56) References Cited

U.S. PATENT DOCUMENTS

| | | | | |
|---|---|---|---|---|
| 2010/0216429 | A1* | 8/2010 | Mahajan | 455/411 |
| 2011/0258692 | A1* | 10/2011 | Morrison | G06F 21/53 |
| | | | | 726/11 |
| 2012/0030731 | A1* | 2/2012 | Bhargava et al. | 726/3 |
| 2013/0029653 | A1 | 1/2013 | Baker et al. | |
| 2013/0145429 | A1* | 6/2013 | Mendel et al. | 726/4 |
| 2013/0253942 | A1 | 9/2013 | Liu et al. | |
| 2013/0298664 | A1 | 11/2013 | Gillette, II | |
| 2014/0115659 | A1 | 4/2014 | Attfield et al. | |
| 2017/0331789 | A1* | 11/2017 | Kumar | H04L 63/0272 |

OTHER PUBLICATIONS

"Computer Networks", Tanenbaum, A. Andrew and Wetherall, D., 5th Ed. Prentice Hall (2010).
"Prolog Programming: A First Course", Brna, P. (Mar. 5, 2001). Retrieved from <http://homepages.inf.ed.ac.uk/pbrna/prolog book/> on Mar. 16, 2013.

* cited by examiner

SYSTEM AND METHOD FOR SECURE, POLICY-BASED ACCESS CONTROL FOR MOBILE COMPUTING DEVICES

CROSS-REFERENCE TO RELATED APPLICATIONS

This application is entitled to the benefit of, and claims priority to: U.S. Provisional Application 61/673,220, filed on Jul. 18, 2012; and U.S. Provisional Application 61/816, 643, filed on Apr. 26, 2013; all of which are included by reference as if fully set forth herein.

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

The technical fields are: Telecommunications, Digital Communication, Computer Technology, and IT Methods for Management.

BACKGROUND ART

Recent years have brought the emergence and rapid proliferation of mobile computing devices such as mobile telephones or handsets with extensive computing, communication, and input and interaction capabilities ("smartphones") plus a growing array of other mobile computing devices such as touchscreen tablets, netbooks, electronic document readers, and laptops in a wide range of sizes and with wireless and wired communication capabilities. This proliferation of mobile devices has been accompanied by complementary advances in development and adoption of long range, wireless broadband technologies such as 3G and 4G, as well as commonplace deployment of shorter range wireless technologies such as the 802.11 series of wireless standards and BLUETOOTH® short range wireless, all with considerable bandwidth. These technologies span multiple radio frequency bands and protocols. Alongside the radio transceivers for such communications capabilities, many of these devices also contain an array of onboard sensors such as cameras, microphones, and GPS receivers plus other locating technologies, as well as considerable fixed-onboard and removable memory for information and multimedia storage. Furthermore, smartphones and similar devices are typically capable of running a wide variety of software applications such as browsers, e-mail clients, media players, and other applications, which in some cases may be installed by the user.

Along with the profusion of smartphones and other mobile, wireless-capable devices, there has also been a dramatic increase in the use of social networks and related technologies for information sharing for consumer as well as for professional uses. Access to social networks on mobile devices has heightened concerns about individual, government, and corporate information security, and about possibilities for privacy violations and other unintended and undesirable information sharing. Furthermore, the possible professional and personal use of any given handset presents a complex set of usage contexts under which rules for device capability usage and information access need be considered.

Such sophisticated and capable smartphones and similar devices, along with the vast amounts of information that they can contain and access, present a large set of potential security vulnerabilities (a large "attack surface") that might allow information to be accessed by malicious parties or allow undesirable use and exploitation of the device capabilities for malicious purposes such as "phishing" fraud, other online fraud, inclusion in botnets for spam transmission, denial-of-service attacks, malicious code distribution, and other undesirable activities. Furthermore, compared with conventional desktop personal computers, smartphone handsets by nature are portable and thus more easily stolen. Portability also means that the devices will encounter more varied security contexts difficult to foresee, and which may only occur once or twice during the lifecycle of the device. The mobile threat landscape is complex and presents a vast set of extant and emergent security concerns. Therefore, there is a pressing and growing need for comprehensive and secure systems for controlling access to the capabilities and information present on mobile devices.

Policy enforcement mechanisms, and policy frameworks—even rule-based ones—are not new. See, e.g., U.S. Pat. No. 5,881,225, U.S. Pat. No. 7,140,035, U.S. Pat. No. 7,246,233, U.S. Pat. No. 7,640,429 (which shares a common inventor with this application), U.S. Pat. No. 8,127,982, U.S. Pat. No. 8,285,249, U.S. Pat. No. 8,463,819, U.S. Pat. No. 8,468,586, US 2009/0205016, US 2013/0029653. However, even where they are not merely limited to authentication, or highly specialized applications (e.g., parental controls), existing technologies are ill suited for today's mobile network environments. None disclose an architecture or means of policy development and verification suitable for such a diverse set of devices and potentially hostile environments contemplated by the invention.

In contrast, the invention disclosed herein pertains to a very granular and secure policy-based control of capabilities, information access and resource usage on handsets and other mobile computing devices. Also presented are certain special methods and techniques within this invention for preserving the confidentiality of system communications and stored information, for removing, or eliminating exposure of, certain security vulnerabilities, and for defending the system and the handsets protected by it from various kinds of attacks and unwanted activities. Among the novel aspects are: a client/server architecture; a policy development, verification, and introspection means usable in modern wireless networks and the devices that may communicate over them; hierarchical policy delegation and priority; a policy resolution engine that maximizes both flexibility and performance by allowing evaluation of dynamic runtime policies alongside compiled ones as well as a caching mechanism for server-provided policies and rules; event-driven policy resolution and enforcement; hardened enforcement at the CPU layer; to name a few.

SUMMARY OF THE INVENTION

The present invention is a secure, highly scalable, policy-based access and resource control system for protecting computing devices from various threats and for controlling their usage and access to information.

Particularly notable is the granularity of control that the invention allows in regard to permitted operations, including network, file system, and device access. In one embodiment, the invention utilizes one or more Policy Decision Point (PDP) servers, which respond to encrypted queries from handsets controlled by a given instance of the invention. These PDP servers may be remote from the handset, or may even be hosted within the handset. The queries typically encapsulate requests for use of specific handset or network-accessible assets. The PDP response to such a request is then received by the querying handset. Subsequent decisions made by the PDP are then enforced at the Policy Enforcement Points (PEPs) on the handset.

Note that while the devices, apparatuses, systems, methods, and techniques described herein are applicable to mobile handset security, those skilled in the art will recognize that much of what is described can be applied to other areas of information access and computing device security. The terms "handset", "mobile device", "mobile handset", "mobile computing device", etc. in this document are interchangeable with each other, and should also be interpreted to encompass any computing device that may benefit from the invention, not solely smartphones or similar devices. Neither the description nor the examples should be taken as limiting the generality or the applicability of the invention to mobile handsets and wireless networks specifically.

DESCRIPTION OF THE EMBODIMENTS

The following describes preferred embodiments. However, the invention is not limited to those embodiments. The description that follows is for purpose of illustration and not limitation. Other systems, methods, features and advantages will be or will become apparent to one with skill in the art upon examination of the following figures and detailed description. It is intended that all such additional systems, methods, features and advantages be included within this description, be within the scope of the inventive subject matter, and be protected by the accompanying claims.

The present invention pertains to a secure, highly scalable, policy-based access and resource control system for protecting mobile computing devices from various threats and controlling their usage and access to information.

Figure 1:
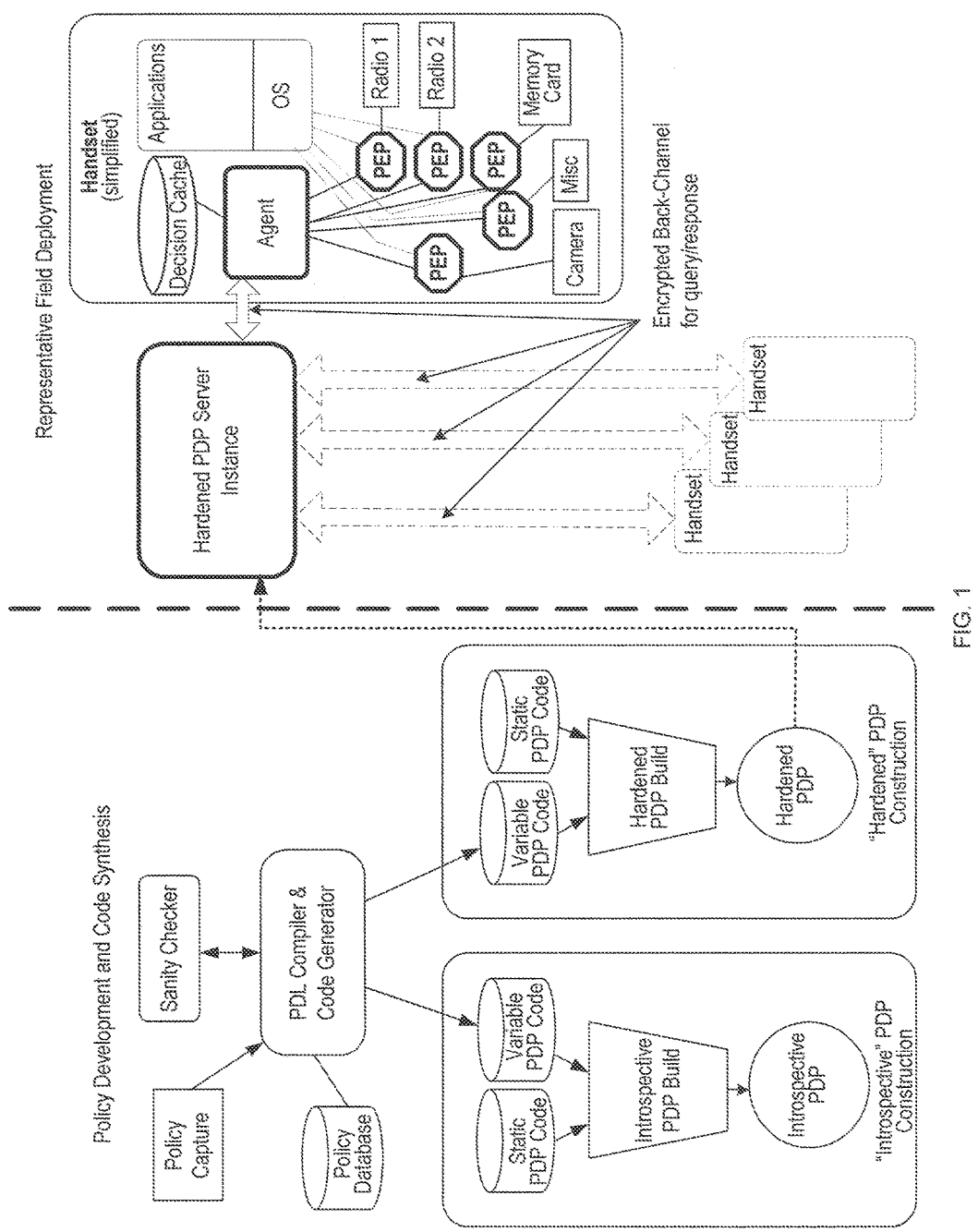
FIG. 1 is a schematic representation of one embodiment of the invention.

FIG. 1 is a schematic representation of one embodiment of the invention. In the depicted embodiment, the invention incorporates agent software and special policy enforcement points (PEPs) that are resident on handsets protected by the invention, specialized servers that serve as Policy Decision Points ("PDPs") that contain definitive versions of policies and processing logic, secure means of communication of handset resource states, other contextual information, and policy decision information between handset(s) and server(s), as well as local policy caching on the handsets. In one embodiment, the invention utilizes a unique policy definition language, or policy object language (POL) for describing policies to be enforced, with tag-based policy definitions, and a specialized structure for hierarchical policy-set representation and processing.

In one embodiment, the invention includes a specialized POL compiler that dynamically generates and outputs software source code containing a policy logic implementation for a given policy set that is then combined with supplementary static code elements for compilation into PDP server executables. Two distinct forms of these executables, compiled from distinct but functionally similar code bases, are employed in one embodiment of the invention. First is an "introspective" version to suit purposes such as policy development, feature development, debugging and functional verification and testing. Second is a high performance, hardened executable server for deployment purposes. Instances of these latter, hardened PDP executables handle queries from client handsets in the field and provide responses. PDP servers serve to compute policy decisions based on policy-based logic plus handset state information and other contextual information such as user role and location that may be available.

In one embodiment, each handset protected by the invention has installed software (termed "DEADBOLT™") with capabilities including an agent implementation for performing secure query and response communication with remote PDP server instances and other supporting tasks, and for managing enforcement of policy-based decisions, either directly as received from a query-response, or from a local decision cache. Enforcement of decisions resulting from handset queries to a PDP or of cached decisions is performed at the PEPs, which are inserted typically via software on the handset, in some cases at a lower level than the device operating system so as to eliminate certain vulnerabilities such as undesired root access and other exploits. The PEPs thereby serve to provide rigorous enforcement of access decisions, in some cases by appropriately controlling access to resources and information located on the handset or elsewhere such as in a remote location on a network, and by monitoring the execution of allowed actions. In some cases, such control will consist of appropriately allowing or denying access to a resource. In other cases, intermediate limits of usage of certain resources can be applied, such as bandwidth throttling (or other Quality of Service (QoS)

limitations or priority levels) or other variable control of certain assets such as maximum picture capture resolution allowed from a camera, or maximum memory and CPU utilization allowed to an application.

Figure 2:
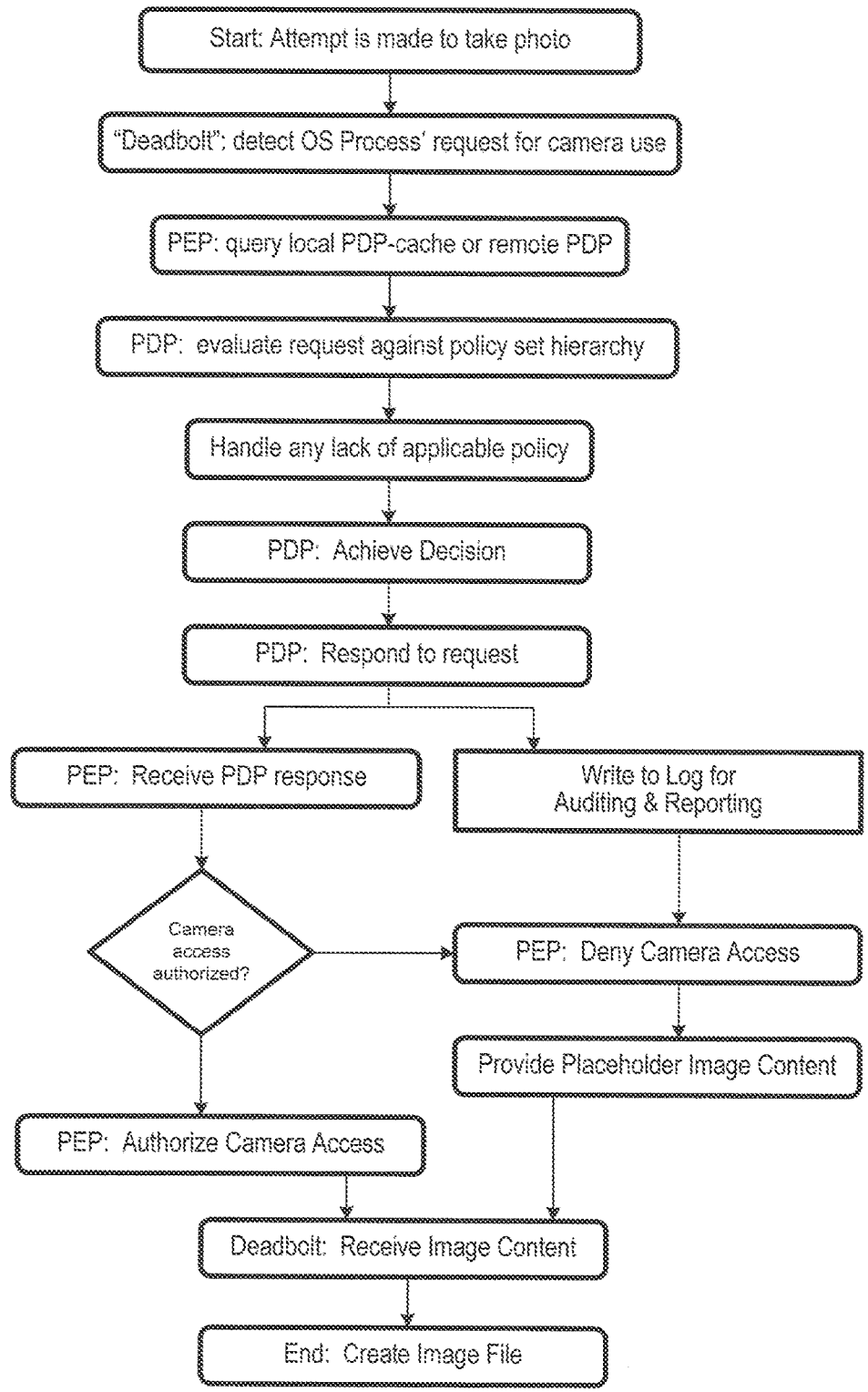
FIG. 2 is a flowchart for a camera access use case example in one embodiment of the invention.

FIG. 2 is a flowchart for a camera access use case example in one embodiment of the invention. FIG. 2 presents a typical scenario in which one embodiment of the invention might act to defend against unauthorized use of a handset resource. It is a simplified schematic representation of a simple example of responding to an attempt to use an onboard camera on a handset to take a photo. In the example, the DEADBOLT™ component initially detects the attempt to access the handset camera. Subsequent querying to a PDP component results in analysis of whether or not such use of the camera is allowed by the declared policies given various contextual details such as the device location and the application from which the camera access is being requested, and ultimately a decision is made based on analysis of the requested action against the declared policies. This decision (allow or deny) is then enforced by the inserted PEP component for controlling camera access and ultimately an image file (real photo or placeholder, in this example) is written on the device.

Policy Object Language (POL) Definition, POL Processing and Other POL Details

One embodiment of the invention utilizes a unique policy object language (POL) for expressing policies and policy sets, and employs a specialized policy processor that synthesizes and outputs source code for later use in building PDP servers. A "policy" consists of rules and restrictions governing how a certain handset capability, onboard device, or onboard information, or network-accessible information, or any other asset or resource that the handset might be able to access, control or otherwise utilize, may be accessed and used by the handset user or by other entities. A "policy set" is a collection of policies and associated information, including policy ownership information. Here, a "policy-owner" is the person or entity having responsibility for the policies in a particular policy set. Each 'policy-owner' establishes policies to cover security concerns for some entity. As non-limiting examples, such an entity might be a wireless carrier or other network service provider, or a provider of a service available over a network, or a device manufacturer, or a corporate device owner, or an end user of the device. In some cases, the policy-owner and that entity might be identical. Considering that policy sets represent valuable security expertise, and require time to develop and test, it is contemplated that within the present invention, policies and policy sets may represent commercial value and a business opportunity. Policy sets potentially could be bought and sold, or otherwise licensed, in return for financial compensation.

Applying policies whose consistency and other similar properties have not been verified will likely lead to operational problems in a mobile context. Rigorous verification of the sanity of a large set of policies is intractable and infeasible in the field. The POL language has therefore been restricted to a declarative form that makes large sets of policies susceptible to property checking through static, symbolic logical analysis. In one embodiment, the POL compiler issues a description of all entities in a policy set as a logic program (e.g., Horn clauses), for which a set of predicates (e.g., written in Prolog) can be used to check that desirable properties are maintained for all policies within the PDP. An example of such a property would be: for a given set of dynamic values supplied by a query, at most one policy is selected at any rank in the policy-set hierarchy. The invention enables this approach to be both feasible and—most importantly—of low order polynomial complexity, as a result of the design of the language.

In one embodiment, there is a hierarchy of policy-owners so as to establish priority of one policy set over another; it is anticipated that in some instances policies from different policy sets may overlap or "collide" in that, for example, they may govern usage of the same resource or govern access to the same stored information, potentially with conflicting rules. For the purpose of conflict resolution and for other reasons such as efficiency and tractability in processing, a tree structure is used in an embodiment of the invention to represent the hierarchy of policy sets based on their ownership, as described below. Other hierarchical structures such as pyramids are also contemplated within the present invention for representing policy sets.

In a given policy set tree for one embodiment, a given policy set resides at one node at a particular hierarchical level in the tree. A policy set having the highest-priority (most powerful) owner resides at the tree "trunk" or "root". For any PDP server, there exists at least one policy tree. The PDP may contain policy sets for several owners, whose policy sets are ranked in order of priority by a configuration statement that defines the policy tree. When a query is received by a PDP, a search is made for eligible policies in policy-owner priority order. If one is found, its contents determine the query outcome. If none is found, policy-owners can optionally include or reference default policies to catch this case. Default policies are typically applied in reverse-rank order at the end of a policy chain. These default policies then essentially describe the degree to which a PDP is permissive or restrictive in nature. A PDP may be declared permissive or restrictive overall, in which case an otherwise unmatched query will be, respectively, accepted or rejected, if no other policy has been found eligible. All policy sets residing within a given policy set tree may be described as a "policy set family", and the set of policies that determine the query outcome may be described as a "policy chain". This policy chain, which may include default policies as described above, is a key aspect of the invention.

The following Policy Object Language (POL) definition is used for expressing policy sets and policies, and for use in policy processing and output. The language is tag-expressed and currently incorporates the following elements, but is readily extensible if additional elements and descriptors are needed:

Policy set: Declares the policy set to which all subsequent POL statements refer until another policy set statement is reached.

Dynamic: Declares a name, within the current policy set, associated with the dynamic element at a given index within the query sequence. Statement may declare a constraint on the values permitted for the element.

Deftag: Declares a tag, specifying the input and output types for the tag.

Discriminant: Declares a dynamic and an optional tag expression. Discriminants are used for selecting policies eligible for resolving a query.

SAOA: The main policy specification statement that follows a Subject-Agent-Object-Action paradigm. The specification includes:

Discriminants: Which, if satisfied by the dynamics in the query will cause the policy to be eligible/selected for the decision. There is also a 'universal' discriminant symbol '*', whose use denotes that the policy will always be selected as a candidate for the decision.

Conditionals: Once policies have been selected on the basis of analysis of discriminants, for each such policy, in priority order, a set of (possibly empty) Boolean expressions on relational expressions involving tag-expressions and constants is evaluated; these expressions are referred to "conditionals" and have labels such as Subject, Agent, Object, and Condition. The highest-ranking policy for which all non-empty conditionals evaluate to true, is selected as the decision-making policy. Booleans representing tag-expression satisfaction are also available (e.g., the tag-expression does exist for the value of the associated dynamic).

Verdict: Response to query from PEP/PDP dictionary (e.g.: allow, deny, etc.).

Stipulation: Duration or stringent limitation on verdict; a stipulation is a requirement that a Policy Enforcement Point must fulfill. A "stipulation" may also be described as an "obligation".

Default status: whether this is a default policy.

Action: operation requested on object by query.

Other tag elements such as intervals, time of day expressions, regular expressions, and expressions describing locations and geospatial regions and volumes. Here, location data may or may not include longitude, latitude, plus altitude or other 3D descriptors, and may include political, territorial, municipal, and cadastral references, home, corporate, and government addresses, and other references to location such as geographic features (e.g., rivers, lakes, oceans, floodplains, mountains, etc.).

Policy-config: establishes the dominance lattice between the policy sets included in the PDP. Here, each participating policy set instance is declared with its instance identifier (ID) in the lattice that the entire tree presents, the policy set it implements, along with the instance ID of the policy set above it on the chain that connects it to the root policy set.

The Policy Compiler and Code Generator performs a topological sort on the instances and then assigns each of them a rank equal to its distance from the root.

There are also statements within POL for populating tags with values.

Policy Flow/Methodology

Figure 3:
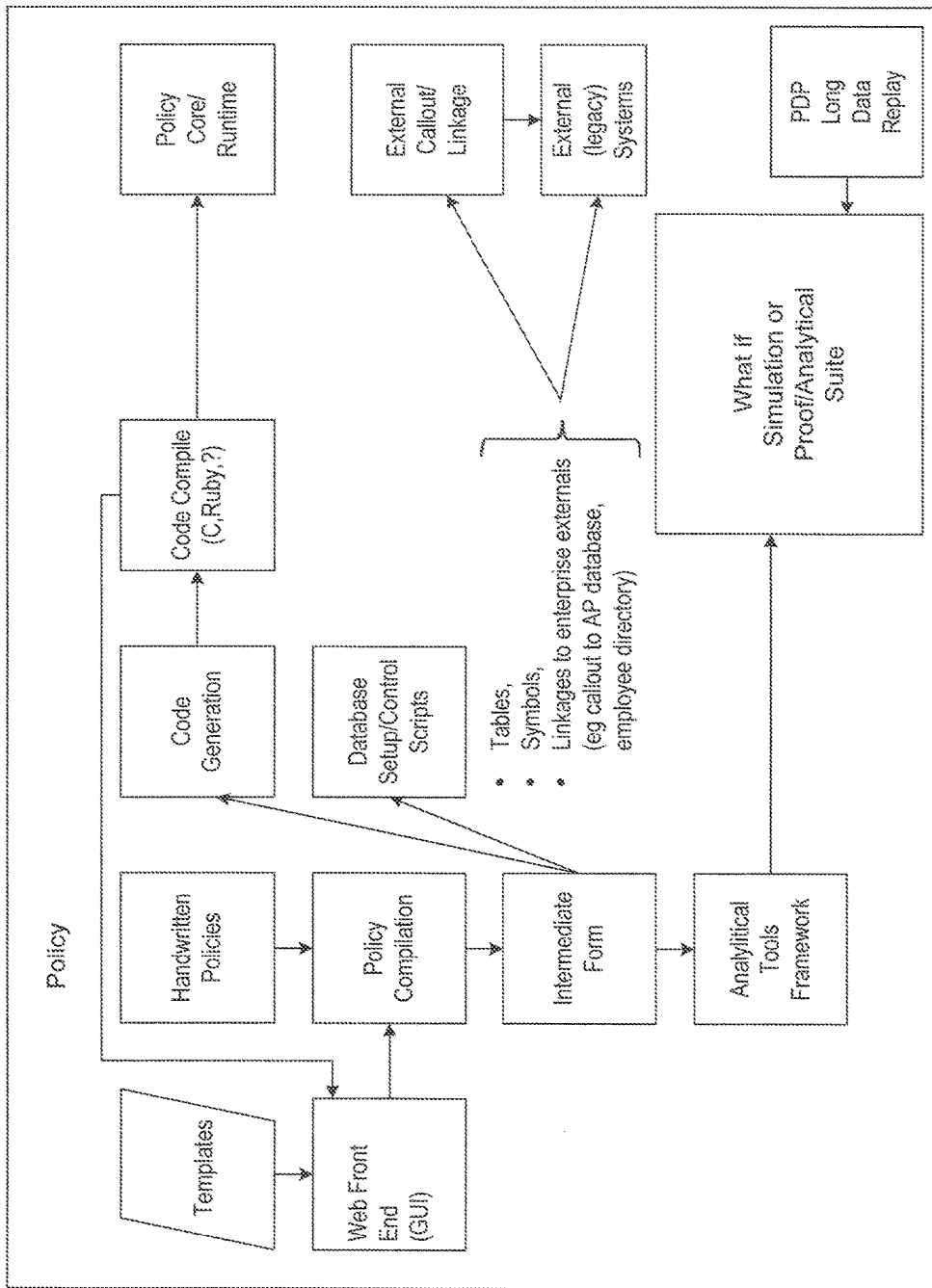
FIG. 3 depicts one embodiment of the invention including a policy capture, compilation, simulation, and operation architecture.

FIG. 3 depicts one embodiment of the invention including a policy capture, compilation, simulation, and operation architecture. Note that in FIG. 3, the hardened policy core runtime only calls its private database; there are no callouts to external databases from the PDP. Any information that is called out of those databases is done at the time of the compile, and becomes part of the PDP's private database. To further secure the private database, the private database may be locked, for example by means such as with a randomly generated key, with said key compiled into the PDP itself, to prevent any changes being made to it.

A set of policy templates can be developed that capture the intent of generic but reusable policy expressions. Examples include ability for applications to run within certain constraints: location, time-frame, user, user-role. Expressions that capture network activity intent such as use of specific network-accessible services, or various malicious intents such as specific vulnerability exploits, can be written.

Policies can also be handwritten (initially in any case). Text form is then compiled into an intermediate format (IF) suitable for generation of code that is targeted to a runtime library. The IF can also generate scripts for database control (if necessary, e.g., in case Ruby framework is not used) and linkages between the PDP runtime and external callouts.

The intermediate form can also generate output suitable for analysis by an analytical tools framework. Interaction with a simulator or what-if capability that makes use of PDP log data gives ability to play 'what if' scenarios that allow for test of policy changes before go-live on production systems.

It is further notable that, for one embodiment of the present invention, while conventional compilers typically take their input from one or more files and produce an executable, the POL compiler is a class object, hereafter called "Policy_core", with a set of object methods for controlling it. The policy core is created by the POL compiler (along with other components) and is itself the intermediate form.

One such agent may be a text-file agent. When such a text-file agent uses the Policy_core, the combination is a classic compiler. However, other agents are contemplated within the present invention, such as a web-page agent (web GUI), which—as a result of its state (user inputs and other supplied policy-related information such as default values)—can send POL statements to the Policy_core. Moreover, such a web agent can also instantiate a text-agent, feed the text-agent the policy-core it is using along with a file-path, wait while the text-agent compiles the file, and then take back control. Thus, within the invention is a particularly flexible compiler methodology that allows for a variety of web-based compilation schemes. For example, once a user has logged in, depending on permissions, status, certificates, and so on, the initial web-agent may invoke different subsequent agents (pages), passing the policy-core object around as it does, and finally producing the ready-for-compilation code, after the user's actions have steered through whatever sequence of pages are chosen or permitted. The invention also contemplates providing policy-core methods that allow agents to extract information on the state of the compilation at any point in the process (e.g., for web page display).

Even for small policy sets, it is challenging to determine what query dynamics sets would lead to the selection of a particular policy. It is further challenging to compute whether there exist any subsets of the policy set collection that would be selected ambiguously by some set of dynamic values. A high quality verification process is required in order to avoid unreliable or dangerous policy sets to be released to the field, possibly creating undesirable or dangerous situations in the mobile community. To this end, one embodiment of the invention provides two phases of verification:

"Do we do the right thing?" The invention uses static analysis verification tools to verify the correctness and consistency of a collection of policy sets without reference to the following Policy Decision Point implementation. For this purpose, the POL compiler creates a complete description of the policy sets as a logic program (e.g., Horn clauses, Prolog) upon which correctness predicates (e.g., in Prolog) may be applied. The POL language has been carefully designed to make this possible and the complexity of the checking process is expected to be low-order polynomial.

1. "Did we do the thing right?" The static analysis verification phase finds the dynamic value sets that select the policies as a side effect of its verification process. It produces a set of stimuli (dynamic value sets) and responses (the decision response information from the selected policies) that are applied through a test harness to ensure that the compiled Policy Decision Point behaves as predicted by the POL-defined policy sets.

Aspects of Policy Definition and Nomenclature

The following term definitions are helpful in expressing policies.
  Subject: An entity or activity that requires access to resources in order to perform its function.
  Agent: The application or executable code that performs an action on an Object on behalf of a Subject.
  Object: A resource, presumably of some value, upon which a set of defined actions or activities can be performed.
  Action: What will happen if the query is allowed.
  Environmentals: Plainly observable facts or circumstances pertaining to the query such as time of day, location, presence of a network connection or beacon, etc.
  SAOAE: Subject, Agent, Object, Action, Environmental.

Policies control and enforce the authorization of actions or activities that may be performed on an object. From the perspective of an object, policies define the circumstances that must exist before an action can occur. The set of actions that can be performed on an object must be identified in order to write policy that governs them. The circumstances under which actions can occur must be identified. The subjects and agents that can perform actions must be identified.

Figure 4:
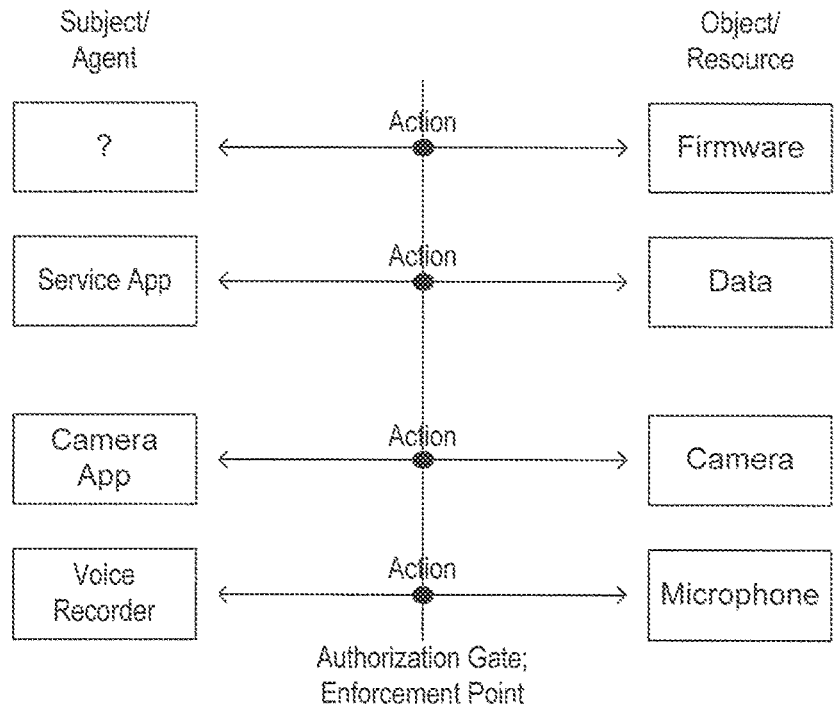
FIG. 4 depicts a case where minimal granularity describes the relations between several subjects and objects.

FIG. 4 depicts a case where minimal granularity describes the relations between several subjects and objects. From the computer perspective none of "firmware", "data", "camera", or "microphone" are typically aware that they are firmware, data, camera or microphone. They are all file-like objects and present software programmatic interfaces that allow them to be accessed as such. The policy writer's challenge is therefore to name objects so that they have meaning. Further, the location of enforcement points, being the authorization or control point for an action, must be identified for the actions that can be performed on the object. The policy writer must also define a means of identifying and naming subjects or agents that need to perform actions on respective resources.

Figure 5:
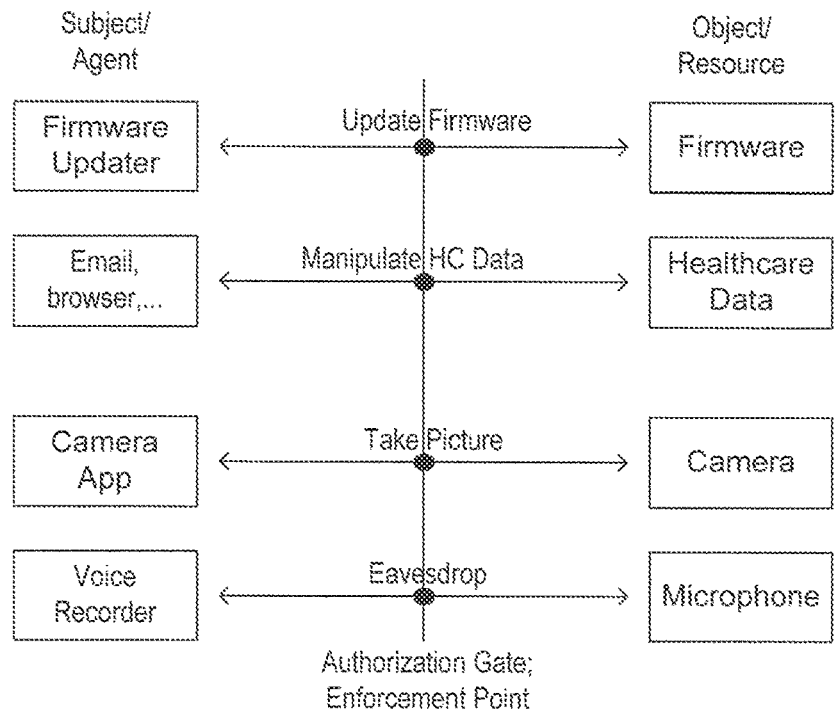
FIG. 5 illustrates several authorizations to a finer level of detail, which may be considered in policy expression.

FIG. 5 illustrates several authorizations to a finer level of detail, which may be considered in policy expression. Objects such as firmware, camera and microphone represent known, identifiable objects on a handset. The subjects that require access to those resources is identifiable and the enforcement points can be conveniently placed at device driver entry points. For example, "healthcare data" is an abstract concept. Several factors must be considered in a computing context. Consider the following questions:
  What properties cause data to be "healthcare data"?
  How can attributes that define "healthcare data" be associated with it? Where can these attributes be safely stored? When must they be updated?
  What circumstances define "healthcare data"?
  What actions can be performed on "healthcare data"?
  What objects or agents can perform actions on "healthcare data"?
  Where can "healthcare data" reside on the device? What protective measures are required to safeguard?
  What are considerations for access to "healthcare data" in terms of "who", "when", "where", "network connectivity", "job function"? Are there negative considerations such as "when not", "who not"?

The answers to each of these questions help define a naming scheme and model that gives meaning to "healthcare data" within the abstract model, that is useful in Policy development.

Tangible handset resources such as camera or microphone have an implicit and readily identifiable set of actions that can be performed upon them. The device driver interface and device name provide a convenient means of identifying and controlling actions on the device.

Policy Decision Point (PDP)

The PDP is designed to be fast and secure. A complete set of policies, which may run into thousands, is stored in an SQL database accessed locally by the server. The policy format and the PDP algorithm are intended to produce a response to a query with optimized database access, wherein the optimizations can be for minimum database access time, minimum query processing time, minimum network utilization, or to suit other constraints. Multiple database lookups may be employed, particularly if intermediate results are required for debugging purposes, although generally the design objective is to respond to any query with a single database access. Moreover, the PDP is stateless and designed to operate in many concurrent instances: a query that is rejected for lack of information at one server, may be re-issued by a mobile with augmented information and be received and adjudicated by an independent PDP server of the same type. As presented in FIG. 1, PDP servers are compiled from a combination of dynamic code generated by the POL Compiler and Code Generator (POLCG) (typically after some degree of policy development), plus static code for supporting operations such as communicating with handsets.

The POLCG may be able to generate two distinct source code bases from which two distinct PDP server versions can be built. These two PDP versions are, respectively, an "introspective" version for use in testing and development (where "development" here refers to both PDP code refinements as well as policy development), and a high-performance, "hardened" PDP server version for use in actual deployment to handle queries from handsets in the field. The former output version, the "introspective" version, is useful in embodiments requiring such introspection but other embodiments not providing it are also contemplated by the invention.

In additional embodiments, the following improvements may further enhance the security of the PDP in a typical implementation:
1. The PDP may have a single input channel on which it receives encrypted queries from the mobile world. The decrypted queries are verified against constraints that are specific to the set of policies embodied in the PDP instance.
2. The PDP may use a single output channel on which it transmits encrypted responses to queries.
3. The PDP may serialize log information to a file for later off-line management and forensic applications.
4. Communication and interfaces may be restricted for an operational PDP. Additionally the PDP may be run on platforms whose OS uses only a secure loader and a severely limited repertoire of other programs. Standard secure authentication techniques (e.g., certificates for binary PDP images and so on) may be used. It is advantageous for platforms to block access to all ports not used by the PDP, once the PDP is loaded and running.

5. PDP may be implemented as a stateless entity. Lack of state improves robustness through complexity reduction and improves scalability via reduced size and ease of rapid virtual machine cloning and deployment.

Any given PDP may contain policy sets for several owners, whose policy sets are ranked in order of priority by a configuration statement and form a policy tree as described previously. Components of policy trees ("subtrees") may be copied and re-utilized in other PDPs, for example to save time in future policy set development for future PDPs. In addition, PDPs could be coupled together cooperatively and assembled into clusters or "virtual PDPs".

It should also be noted that the behavior of the service as well as the device resident software may be optimized for power management considerations, including the following:

1. In one embodiment, the invention may be event-based, such that energy usage is on-demand, to the extent possible.
2. Power management may present a set of events that interact with the framework to minimize energy and battery usage impact of the software.

Policy Enforcement Points (PEPS), Handset Agent, and Communication Back-Channel Details
Enforcement Mechanisms for PEPS It is desirable to have the control points corresponding to Policy Enforcement Points (PEPs) at as fundamental a level as possible on the handset, in order to prevent all possible undesirable usage of the protected assets from everything from malicious applications operating at application level, to "root exploits" that may be able to get root-level access to the handset operating system, among many other threats in the mobile wireless environment. In one embodiment of the invention, a unique coupling is used between decision cache, PEP software, and enforcement mechanisms. Ideally, only entry points such as driver stubs exist in untrusted areas of the OS. Sensitive resources should be referenced by handle only (e.g., certain types of files), with trusted operations taking place only within a trusted zone. Other sensitive data could be object metadata (data that classifies the nature of, e.g., an application or file, for policy purposes), the policy decision cache, plus policy/backchannel code. However, insertion and operation of such low-level PEPs can lead to unwanted performance degradation, and in some cases, to system instabilities. More generally, enforcement mechanisms are constructed that are not trivially bypassed. The simplistic method of checking function return code values (which results in some sort of branch execution at machine level), in the absence of an enforcement mechanism elsewhere, can be fairly easily bypassed by spoofing the return value with forged values or jumping to (or past) the appropriate branch instruction target.

If an exception mechanism (e.g., an illegal instruction, or—in the case of ARM family microprocessors and certain other processors—a Secure Monitor Call (SMC), or similar trap, etc.) is employed as the enforcement mechanism, then the caller process is suspended during execution within the illegal instruction handler or trap. Further, the next instruction to be executed by the caller is subject to the value of the return program counter (PC) that is put in place prior to return from the exception. This means that a return execution address does not have to be collocated with the original trap call nor does it have to contain a branch that corresponds to an allow or deny result. Further to this, the memory containing the subsequent code to execute can be allocated at runtime and subsequently released once it has been executed. This hinders the ability to locate the resource and/or bypass the enforcement and access mechanism. One potential way to avoid this is to have a certain number of instructions post-call decrement an atomic so that the next pass of a work queue can allow freeing/removal of the dynamically allocated code chunk.

A pseudo-code representation of this might be:

void access_resource( . . . ) {
   Preserve the link register (LR) pointing to the return address, and the stack context so that frame can be popped—this function does not "return" in normal sense;
   Gather context;
   Form parameters/vector prior to trap;
   Illegal instruction or trap
}

At the point of trap execution, the PC points to the illegal instruction. Upon return from the trap, the PC will execute the sequence of instructions that allow the attempted operation to proceed (in the case of allowed operation) or fail (in case of denial). The subsequent operation of either the allow or the deny code chunk should either return to the caller (along with whatever is necessary to release stack resources and this code segment) or cause the calling activity to fail. The latter is potentially equivalent to sys_exit if this is a killable process.

Other mechanisms that can be used in conjunction with the above technique are:

Possible use of physical memory; the memory management unit (MMU) is turned off during execution of the code that is returned to the caller. The MMU is then re-enabled at end of execution.

If the MMU has suitably advanced capabilities then hardware protection can be employed such that code is executable but not readable.

It may be desirable to execute the returned code segment without interruption so that a possible observer cannot gain visibility of the memory while it exists.

The Back-Channel

The back-channel is intended to provide secure, high-speed, low latency query/response/push capabilities between Policy Decision Point (PDP) and Policy Enforcement Points (PEP). A back-channel call provides an abstraction that hides decision point, policy and policy management from the PEP, and is managed on the handset side by Agent software that, taken together with PEPs, represents the PEP Client. Further, authorization calls are intended to be fully transparent to calling environments in order that there be no maintenance impact on applications or operating system elements. Communication over the back-channel is encrypted, and may be performed over standard protocols such as TCP/IP or UDP, or other transmission protocols. UDP may preferable in some circumstances over TCP/IP since it is a "one shot" protocol that is less vulnerable to interception of resent packets from "man-in-the-middle" attacks and similar attacks, but may require special handling in case of e.g. non-response or incomplete transmission of a query and response. The invention is not limited to use of either of these protocols, and the choice of transmission protocol may depend on availability due to permissibility through corporate firewalls and other constraints. Other protocols such as SMS could be used in certain cases. TCP has the advantage of reliable, sequenced communication but does not scale well at the server due to TCP protocol control block and protocol overhead for each device. UDP provides unreliable datagram services, which might be adequate however UDP may present challenges if the PDP lives behind certain firewalls. In the case of both TCP and UDP it is intended that SSL or some other encryption scheme will be employed between PEP and PDP.

The PDP and PEP are designed to operate on distinct devices or machines, but it is also contemplated that PDP could run on the same physical device as the PEP. In such a case, the PDP could be operated within a special secure zone on the device, e.g. a "trusted zone" having additional security characteristics beyond those of other functional parts of the device. The PDP is a service that responds to concurrent requests from numerous PEP instances on multiple handsets as shown previously in the right side of FIG. 1.

Figure 6:
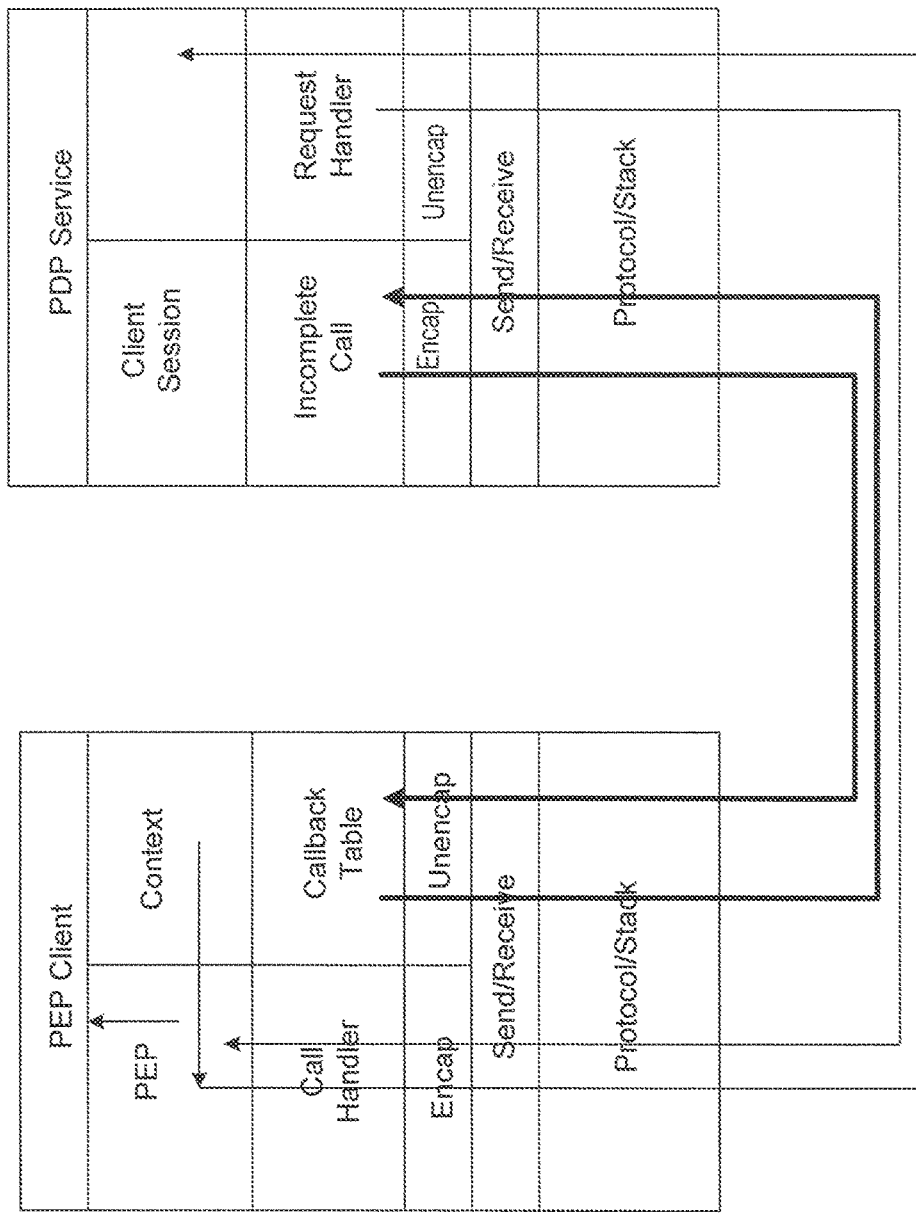
FIG. 6 depicts a conceptual stack diagram of one embodiment of the invention that shows a granular breakdown of PEP and PDP service elements.

FIG. 6 depicts a conceptual stack diagram that shows a granular breakdown of PEP and PDP service elements. The PEP is implemented typically as a function call that guards the completion of an action that is protected by policy. The PEP has access to context data that helps arrive at a decision. Also, the PEP can access a decision cache to reduce load on the PDP and improve overall performance, as well as providing a backup means for handling a lack of response from a query to a PDP, from causes such as a wireless communication failure, or service or network outage.

In FIG. 6, the context block is able to provide contextual information (described, for example, using the SAOAE model defined above) to the PEP including executing binary identifier (SHA1 hash, file metadata), network connection information (interface name and type), location, current user. The call handler is responsible for maintaining and coordinating PEP calls and context. Each outstanding call is a unique instance to support multitasking/concurrency. Responses or timeouts must match a call instance. The callback table provides functions to the PDP. These functions (handlers) satisfy PDP requests for additional information during policy evaluation when the situation arises that inadequate information (e.g., GPS location or X.509 certificate attribute) was presented with the initial decision request. The callback table will also support operations such as decision cache flush or features including device remote-disable trigger and device remote backup.

Enforcement points within the framework are encountered whenever a governed action is about to occur. Enforcement points for different types of objects are implemented via different mechanisms. Separation between resource class types (such as system, application, user data) may help define an index mechanism that facilitates definition of an enforcement point.

Figure 7:
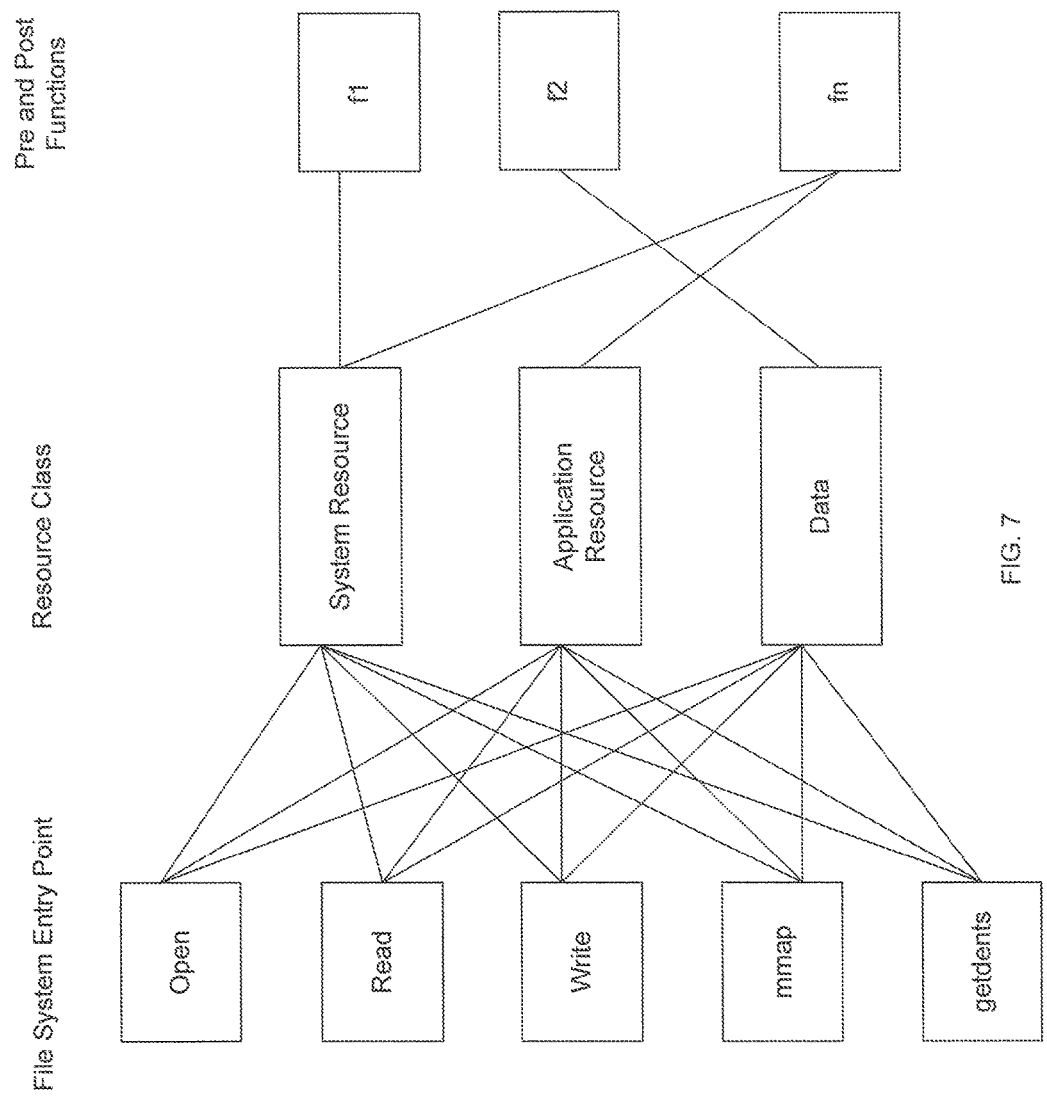
FIG. 7 depicts file system controls according to one embodiment of the invention.

File system controls could be implemented as depicted in FIG. 7. System resources and applications that interact with them can be defined according to device specific information. Table driven code that is automatically generated based upon configuration information or a combination of automatically generated code and base library can be employed. Pre and post functions can be provided from a library of given functions or created specifically for a given object instance. In the case of a policy expression for "data", a classification function could reference handlers that are tuned to various scenarios and these could be coupled to use-case (for example, consumer, enterprise, and fussy enterprise modes). Additional object metadata may be applied describing the data or the purpose of the data, e.g. identifying a file as "Banking Data". When a query is generated, this metadata can be returned to the PDP, which can then use it to aid in decision-making.

Reliability and Security Requirements

PDP and PEP must be able to communicate reliably and privately to enforce trust relationship between endpoints and to prevent denial of service at PEP or attack on PDP.

Encrypted message encapsulation should mitigate replay attacks as well as spoofed (unauthentic) requests. The PEP must detect and disregard forged messages from the PDP.

Figure 8:
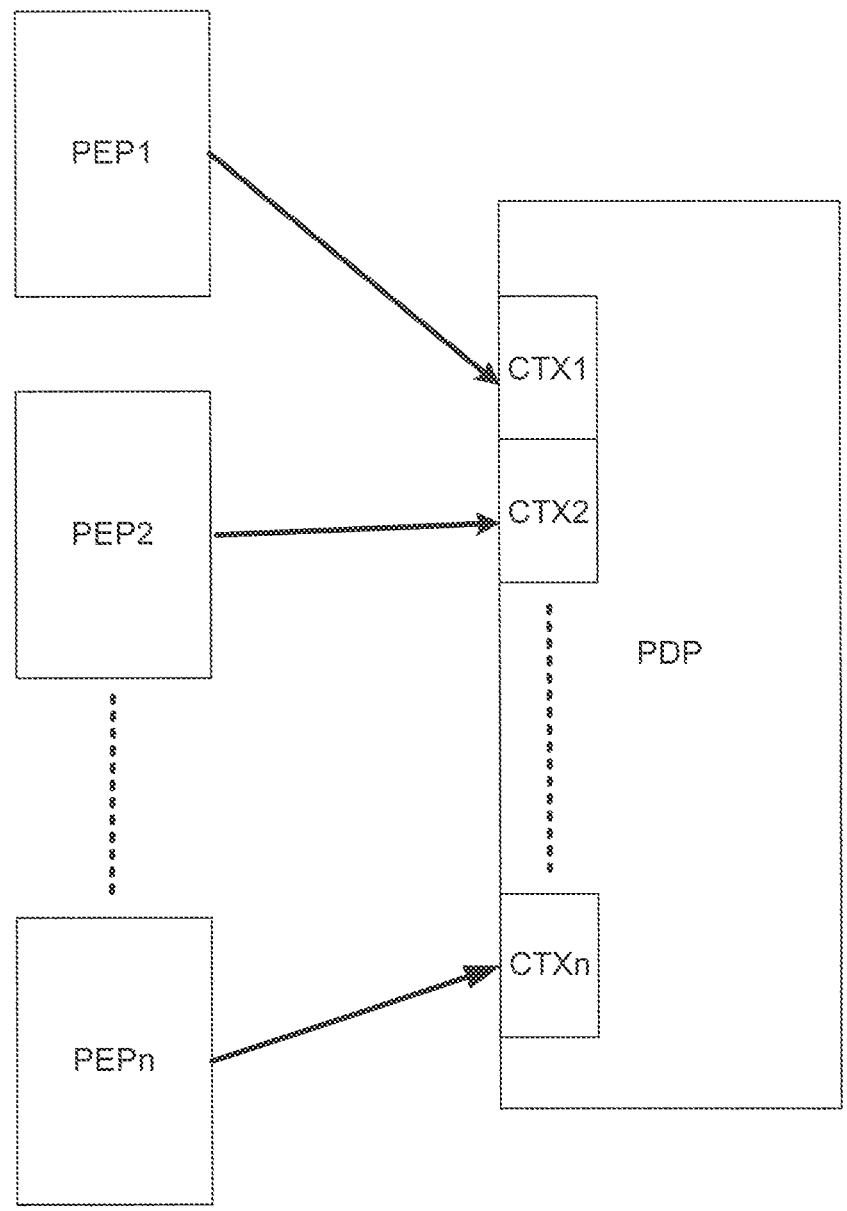
FIG. 8 depicts the PEP/PDP relationship.

FIG. 8 depicts the PEP/PDP relationship. Each PEP (device) has a corresponding context (CTX) at the PDP. Elements of context and its handling may be decomposed across functional layers (communication, device identifier) so that all support functions do not have to reside on the same PDP processor/host instance. Furthermore, it should be noted that the PDP itself is stateless with respect to the PEPs; context here refers to query status such as query received, query waiting to be processed, or query responded to. This state information is necessary to keep the back channel functioning, but is different from the PDP itself keeping track of device state.

Context at the PDP remains regardless of communication protocol (TCP, UDP, other) however its constituent parts will change. In the case of TCP then the TCP protocol control block is an implicit object that is associated with the specific TCP instance that exists with a PEP. Scalability of TCP to support 10s or 100s of thousands of concurrent TCP sessions is debatable due to TCPCB storage and protocol inefficiency.

Figure 9:
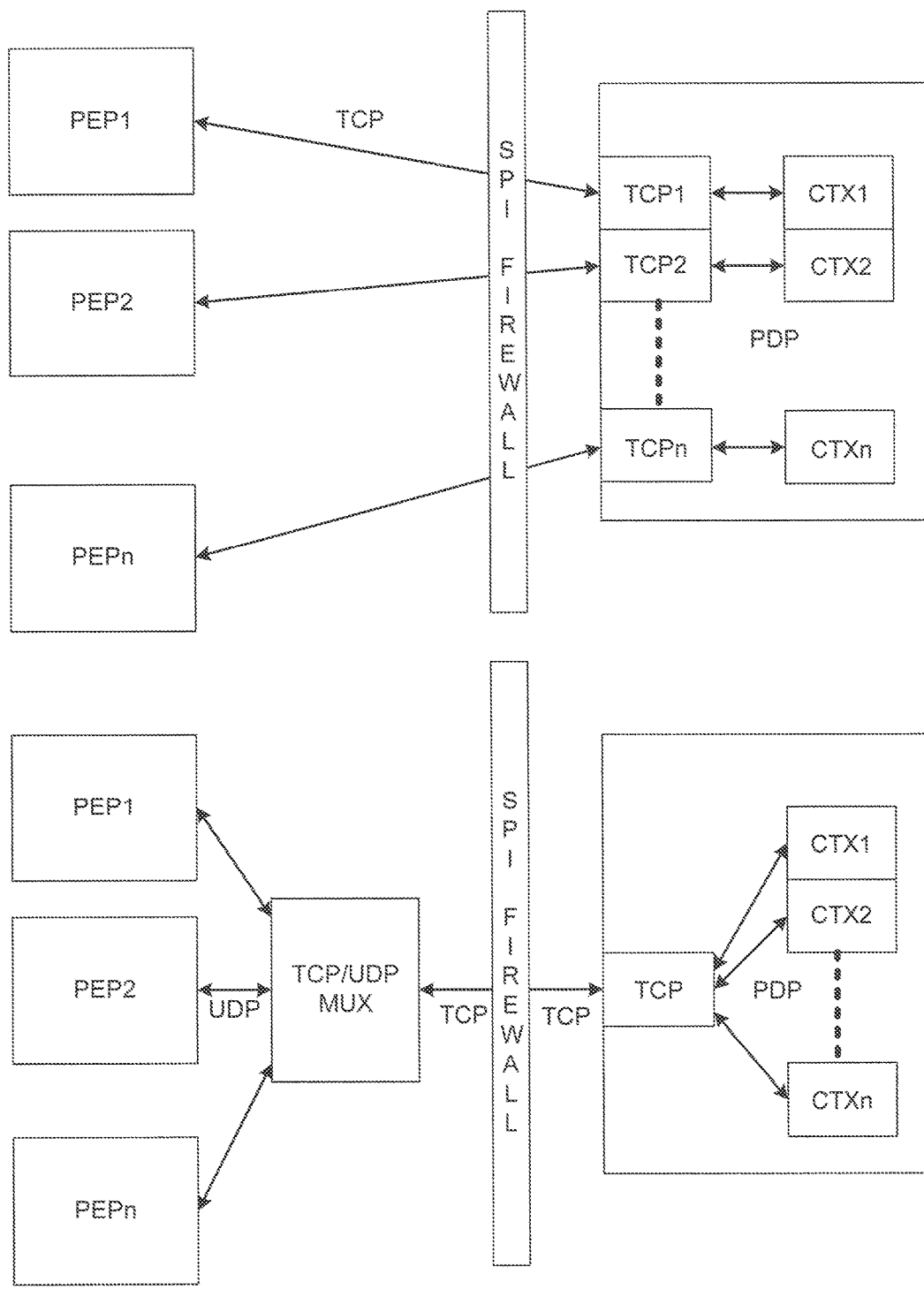
FIG. 9 illustrates two different scenarios that could be employed for communications between PDP and multiple PEPs in one embodiment of the invention.

FIG. 9 illustrates two different scenarios that could be employed for communications between PDP and multiple PEPs in one embodiment of the invention. TCP is used in the first case. Additional IP stack overhead is incurred at the PDP for each PEP along with any other session information that the PDP must maintain. The second scenario suggests a workaround for an SPI firewall in which PEP communicates via UDP to TCP/UDP mux while the mux passes through the firewall to the PDP on a single TCP connection. The latter case significantly reduces IP stack processing at the PDP but incurs additional overhead in TCP messages. Additional overhead consists of IP address and UDP port of the PEP—maintaining these allows the mux to be stateless. Also, encryption load could be reduced greatly if some of the PEP/PDP state/session context information is at the mux. There is risk associated with a compromise of the mux. It may be advantageous to keep the PDP stateless and high-performance while offloading front-end communications (potentially high overhead TCP/UDP/SSL) onto a separate system.

The TCP/UDP mux (multiplexer) represents a custom router. The network segment enqueue and delivery code (linux or freebsd) can be modified so that traffic flows only across selected ports. Further, use of static public IP address for the mux(es) alleviates the need to rely on DNS.

Call Mechanisms

PEP calls exist in synchronous and asynchronous forms. Synchronous forms occur when the PEP call is made in relation to an active system process (i.e., within the context of a calling process). Synchronous PEP calls may cause the process to sleep. Asynchronous forms occur when a PEP call is made from (e.g.) the network segment receive handler (device driver) function.

Figure 10:
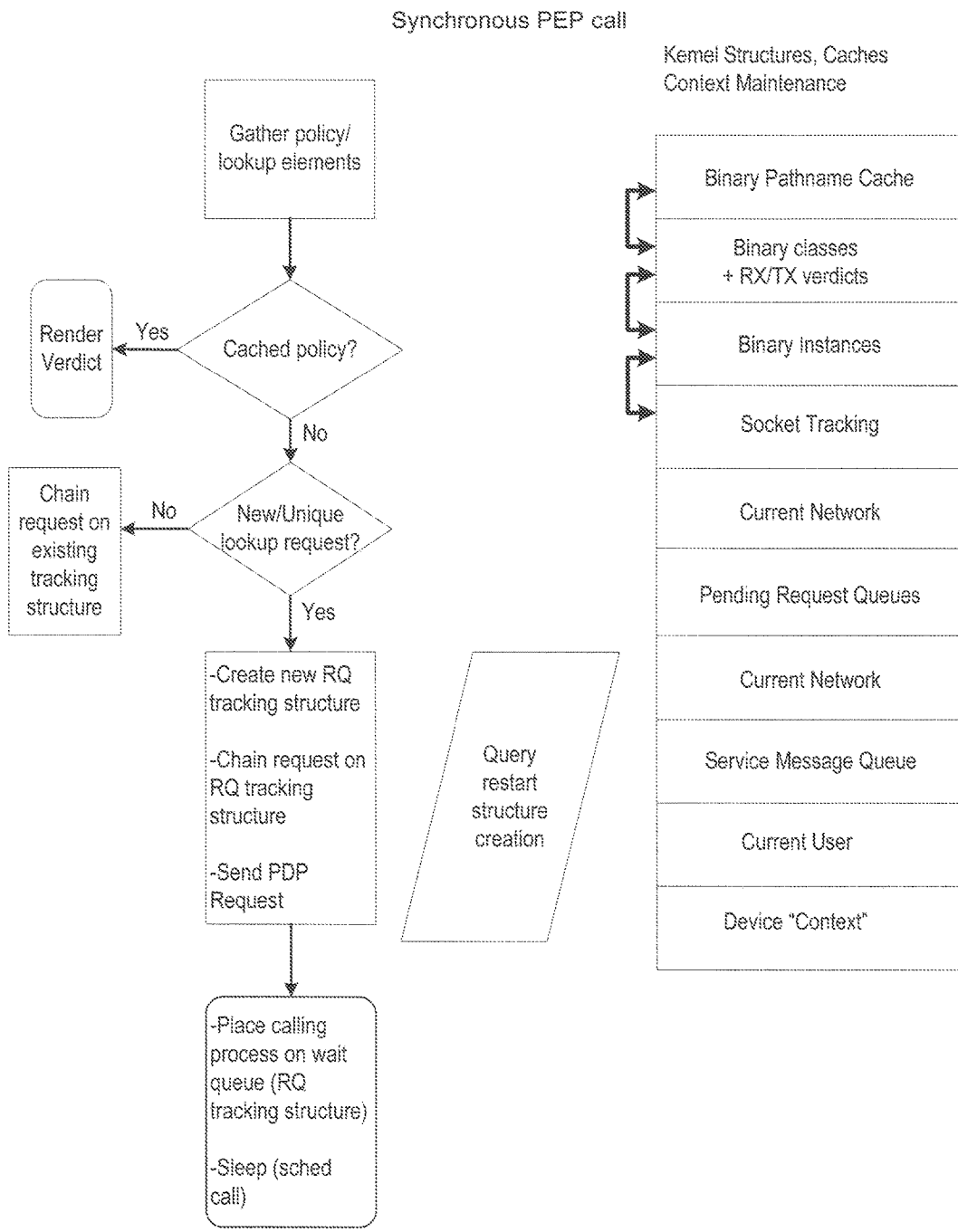
FIG. 10 illustrates processing of a synchronous form in one embodiment of the invention.
Figure 11:
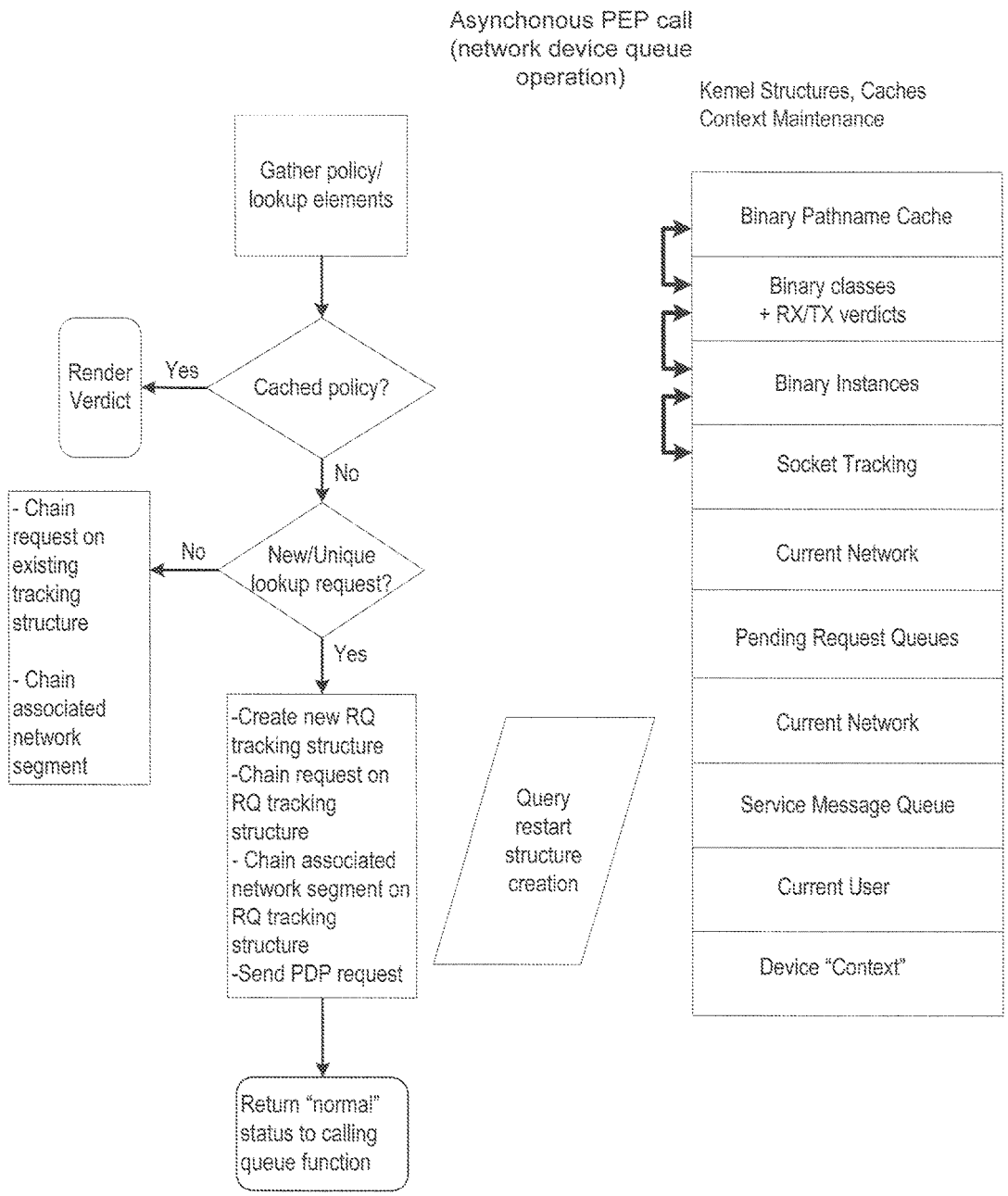
FIG. 11 illustrates an asynchronous PEP call in one embodiment of the invention.

FIG. 10 illustrates processing of a synchronous form in one embodiment of the invention. FIG. 11 illustrates an asynchronous PEP call in one embodiment of the invention.

In both FIGS. 10 and 11, "current user" is presently only a placeholder in a present embodiment. A field exists in message requests but the value is populated from a static variable rather than a lookup mechanism that is bound to a sign-on or authentication mechanism.

Device "context" typically will be at least the MAC address of associated wireless LAN connection, but can be expanded to include e.g. GPS coordinates (if available) and possibly other connectivity identifiers (WLAN SSID). Context in general is any sustainable or persistent representative information about the device that is not specific to a given query.

Figure 12:
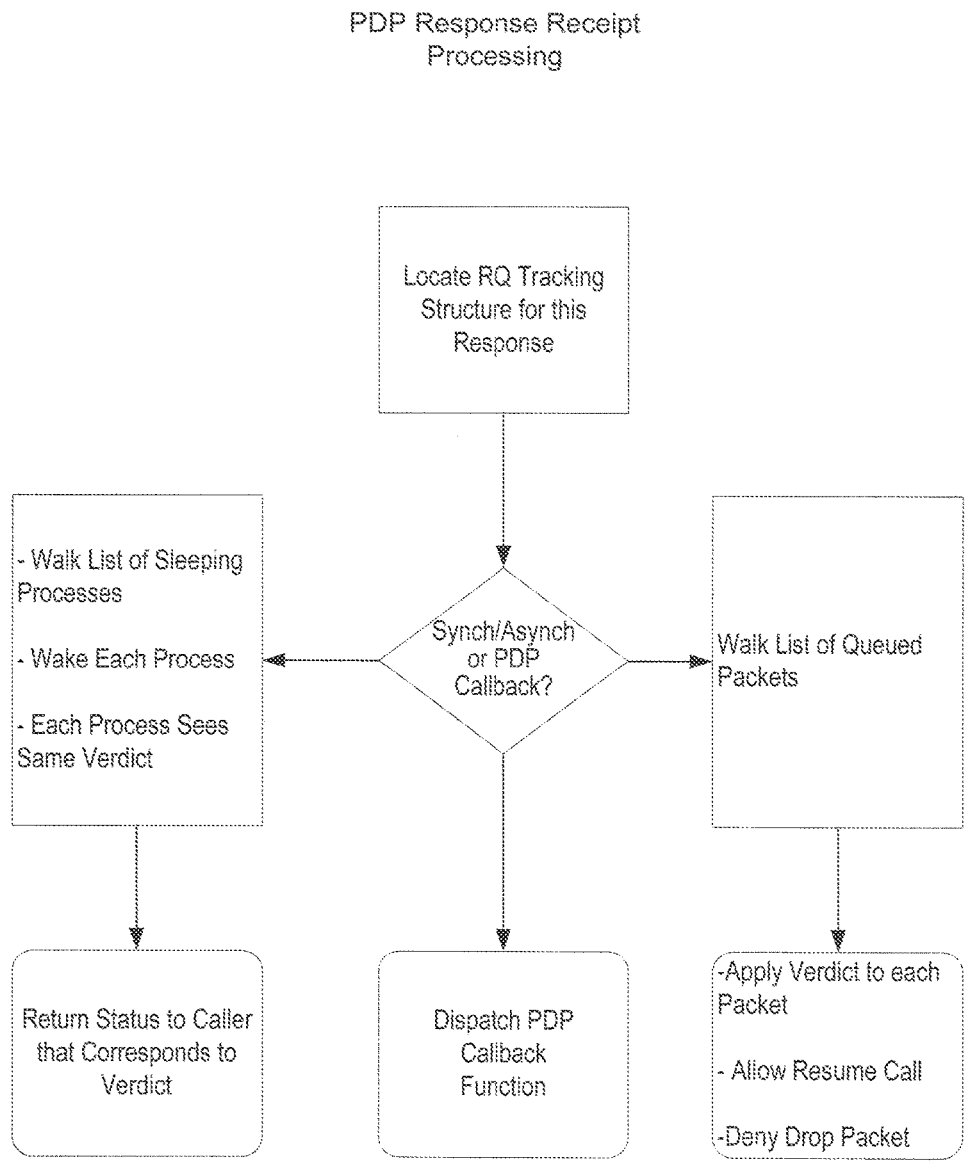
FIG. 12 depicts the processing of messages that are received by the PEP (user mode service/handler) according to one embodiment of the invention.

In one embodiment of the invention, messages that are received by the PEP (user mode service/handler) are processed according to FIG. 12. Three classes of messages may be received externally from the PDP. Responses correspond to asynchronous or synchronous PEP calls or callback requests from the PDP that correspond to a PEP call or device heartbeat timeout. The latter is a time-driven request that is generated by the device in the absence of a recent PDP request (the intent of the heartbeat is to keep the device synchronized with management events that might have occurred within the policy management framework).

User Mode Service

A user mode service, currently known as "loadit" or "dbd", implements the event handler for kernel (PEP) requests and PDP received messages. The user mode service is also responsible for startup activities such as kernel module insertion (driver) and character special control device creation. Further, interaction with the device operator via dialog boxes or popups are handled via this service.

Loadit employs functions within the kernel module to modify unix signal handlers so that neither STOP, TRACE or KILL signals may affect loadit operations. A device resident debugger cannot attach to loadit (and examine its inner workings) because STOP/TRACE are blocked. The KILL signal (Signal 9) is ignored by loadit. Loadit can only be terminated by a device reboot.

Loadit is non-blocking. It is built upon a general file-descriptor event mechanism with callback functions that are based on the select( ) or poll( ) system calls, or similar system capabilities. Multiple threads of execution are implemented in this manner. Each "thread" corresponds to a predefined set of handler functions that implement the functionality of the event handling sequence.

Two state machines represent the message handler within loadit, one each for send and receive processing. The send side machine does not sleep in a process blocking sense but rather causes a message context to be created. Activity on the file descriptor that is associated with the context causes its respective handler to execute.

Loadit normally lives in a wait state whereby any event (message on a file descriptor) causes a handler to run. To simplify PEP functions (obtaining policy from the PDP), the kernel hook points generate messages and submit these to loadit kernel event processing queue. The handler for kernel events can in turn generate PDP requests or cause loadit to execute housekeeping or lookup functions that are more easily completed from user mode than from within the kernel itself (eg., file hashing functions require use of the file system and this is more easily achieved from within user mode than to code a kernel thread that calls the task scheduler directly).

Figure 13:
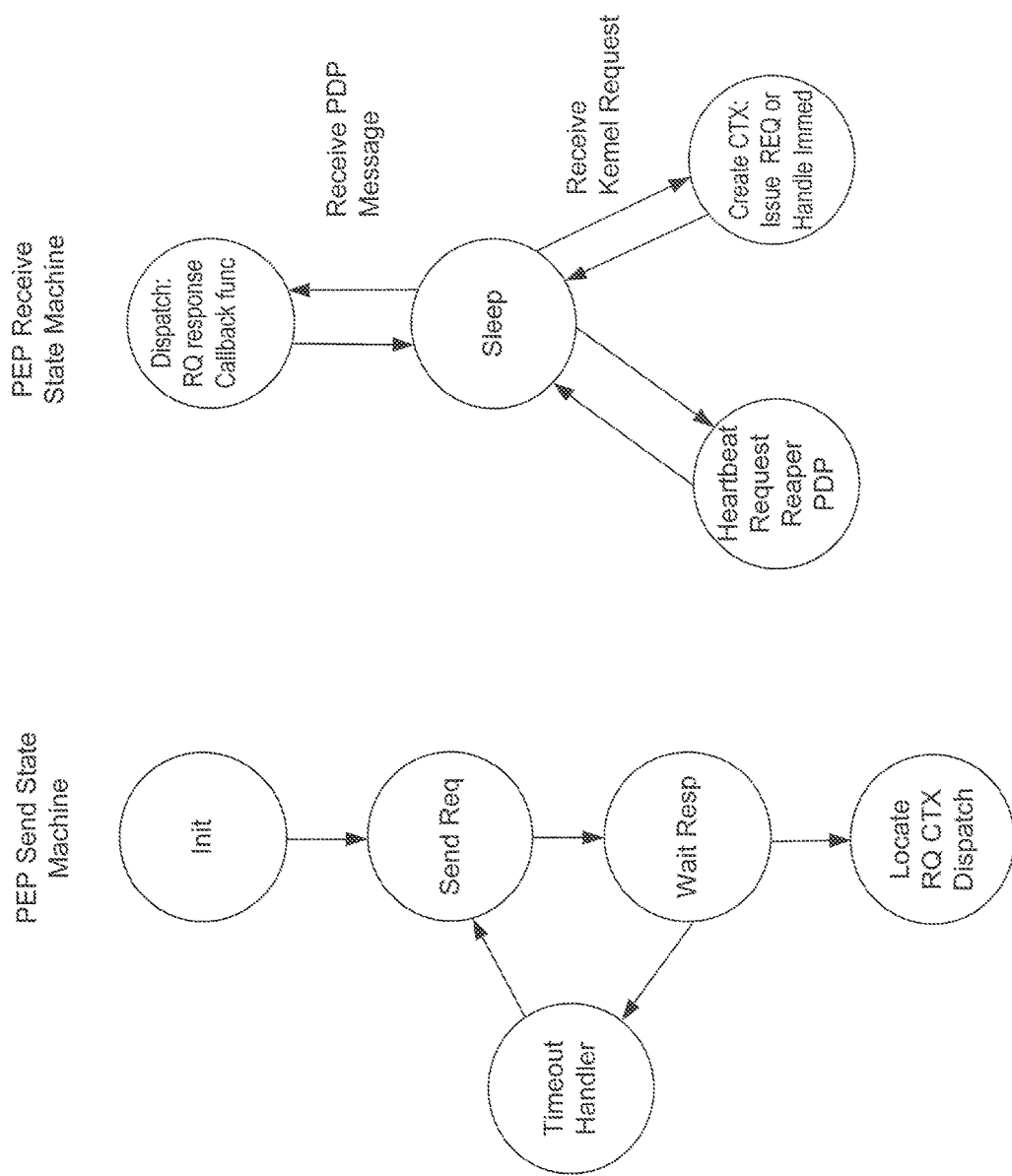
FIG. 13 shows both send and receive state machines according to one embodiment of the invention.

FIG. 13 shows both send and receive state machines according to one embodiment of the invention. Loadit additionally implements a heartbeat function that periodically causes a kernel cleanup function to run. This function causes the releasing of stale structures and performs housekeeping operations on tracking structures that are no longer needed.

Policy Query/Cache—PEP Considerations

It is desirable to have the PEP cache policy decisions in order to reduce load on the PDP and improve overall efficiency.

Tradeoffs that have to be considered for the PEP cache:
cache storage: volatile (kernel, or in RAM) v non-volatile (persistent, storage in flash or disk structure)
space limiting/cache flushing mechanisms: aging (least recently used)
cache lookup: determining what constitutes a cache, ie policy lookup hit.

Cache lookup and matching parallels the decision mechanism of the PDP but does not have the full PDP-set of policy information to work with.

Consider policy elements:
$A=\{a0, a1, a2 \ldots\}$
$B=\{b0, b1, b2 \ldots\}$
$C=\{c0, c1, c2 \ldots\}$
where each of A, B and C represent sets of possible values for considerations such as access point MAC address, binary fingerprint, device identifier.

For a given PEP, the policy would be some expression of a, b, c:
$a | a \in A$
$b | b \in B$
$c | c \in C$ The PEP should only know the decision and stipulations that are returned from the PDP. Computation of don't-care and negation (set inversion) in policy expressions is not possible at the PEP because it does not contain an expression evaluator or the policies.

Let r represent the policy decision:

$$r = \text{element-of}(a) \char`^ \text{element-of}(b)$$

The PEP does not know that c was not a consideration (don't-care). Without a full-copy of the policy set and PDP evaluation mechanism the PEP can only know that the cached result applies to a, b, and c.

This implies that the cache must store a, b, c, and r for all c, regardless of the don't-care in the expression. Storage of this many cache entries could be unbounded but in reality is probably not. If c represents AP location or destination IP address then the set is likely bounded to a relatively small number (consider how many web sites actually get visited or how many networks are attached within a 24-hour period). Cache aging and flushing stipulations further reduce storage requirements.

PEP Cache Volatility and Integrity

Access to the decision cache must be carefully controlled otherwise a rogue application could write a cache expression that causes the PDP to be bypassed (policy does not get enforced). This implies an access control mechanism on the cache.

If cache is non-volatile then it must be secured. Cache entries could be protected using H-MAC (shared secret) or asymmetric key signature (latter is computationally intensive but feasible if persistent cache is reloaded infrequently—such as at-boot).

If cache is volatile then it can be in-memory (kernel memory, managed by the loadable module, is one alternative here. However, the key principle here is that cache storage should be in the most trustworthy storage available, as is the case for code that accesses or manipulates the cache.).

PEP Cache Lookup Mechanism

Policy decisions are cached in the prototype implementation. Decisions are stored in association with the structure that is associations with a tasks-code binary (there is a one-to-one relationship between the binary executable and this structure, each process instance for a given binary references its binary structure).

PEP Client Capabilities for Managing Superuser (Root) Activities on Handsets

One of the important capabilities and goals of the invention is defending handsets from malicious activities such as "root exploits". In a root exploit, an entity gains "root", "superuser" or "administrator" access level, or some similarly privileged access level on the handset operating system by some means, thereby giving that party access to execute commands from root shells having access to core components of the operating system (the "kernel"), the handset file system and potentially to other handset capabilities and components such as baseband processor and storage that is undesirable to policy owners. A typical way of gaining such access maliciously involves the overwhelming of device resources by techniques such as exceeding memory buffer extents (buffer "under-run" and overflow) by some means, resulting in consequences not intended by handset software designers or other stakeholders. It is also advantageous to control root-level access on the handset generally, whether or not the root access holding entity has malicious intent, in order to support various policies that may be owned by certain stakeholders such as a wireless carrier or device manufacturer, or a corporate device owner, or an end user. To serve the purpose of monitoring and controlling root level access on handsets, one embodiment includes a monitoring component (termed "rootmon"). Rootmon may be implemented as a DEADBOLT™ component in that it is capable of locking out or otherwise controlling root-privilege operations and root shell activities on the handset.

Many operating systems are operationally and functionally similar to, or are derivatives of, the Unix operating system. Examples include Linux, and also the Android operating system from Google Inc. The following description of rootmon is based on Android and Linux but the concepts are generally applicable in other operating systems in which kernel protection and superuser access management is desired. Rootmon allows fine-grained control over what binaries may run as root and over the ancestry of the "root context" (how root access may be gained). Root shells and other unauthorized root tasks are potentially hazardous. This is particularly a problem in Android and Linux, which unfortunately employ shell scripts (with root-level access) to carry out various functions. The rootmon module must be capable of distinguishing between an authorized root shell and one that is unauthorized. Doing so allows rootkit malware to be detected and defeated. Also, it requires that root authorization be predefined for a "pristine" device state in order that authorization may be obtained for legitimate root activities. This is also required so that the device will behave as expected, ie "just work", during periods of limited or no network connectivity. Rootmon must be capable of distinguishing between authorized and unauthorized root activities. The distinction between "system" and "non-system" stack components, e.g., system services vs. apps, is a motivator for maintaining context. For example, exploits often pursue a root shell by exploiting a system or service element (a non-application part of the system). There are cases when shell script running as root needs to be permitted as part of a system service. All processes in Linux descend from the "init" process. Processes that execute native binaries are typically executed via fork( ), which creates a more-or-less exact copy of the parent process, followed by exec( ), which loads a new executable image into this process and starts execution at the main entry point). In Android, native binary processes (services) are children of init. Android applications, "apk", are children of "zygote", an instance of "app_process". Android applications do not follow the fork/exec model but instead are created as forks of zygote. The concept is to allow a warm-start of an initialized but empty container in which a Java application can be initiated. Visibility of the Android application startup mechanism is visible from within the OS at the sys_fork( ) call. A process on Linux either has root credentials (uid=0), can assume root credentials (if it is a setuid binary with effective uid=0) or changes itself to be another binary via exec( ) of a setuid-root binary. In the latter case the original binary does not attain root but rather the newly exec'd binary. Initiation of a root process can therefore be detected by: 1) root process creating a child (fork/exec) 2) non-root process becoming root by exec( ) of setuid-root binary.

Rootmon implements a graph or "tree" that corresponds to the ancestry of processes on a system. "init" is always at the root of the tree. Processes created by init appear as children to the root node. A process lower in the tree that has children may exit before its children. When this happens Linux reparents the orphaned children under "init". This represents a loss of information which could hinder the rootmon decision process. Rootmon addresses this issue by maintaining the node in its own tree for the process that has exited. In other words, a process node in the rootmon tree is only removed once all of its children have exited.

The process tree is created by a DEADBOLT™ pre-hook on sys_execve( ) and by a post-hook on sys_fork( ) (which executes within the parent process context), wherein the terms "pre-hook" and "post-hook" refer to capabilities allowing actions to be triggered, respectively, before and after the described event. These hooks are in both the pre- and post-places to catch application launch (a fork but not necessarily an exec) as well as system services (a fork and often an exec to create an independent child process). For tree maintenance purposes, nodes in the process tree are removed by a callback function that is coupled to a task-free notification "task_free register". The rootmon callback is called before the task is finally freed so the "struct task" is still valid at the point at which the callback is made. The rootmon task_free callback function asserts that the corresponding node in the tree has no children before deleting a node. In the event of a leaf node process exiting, then the tree is traversed upwards since previously exited parent process nodes may now be deleted, resulting in upwards branch removal. Addition of a new node in the tree asserts that the ancestry of the new process is known to the tree. Since the module may be loaded late this can cause population of previously unknown tree branches. In all cases, the tree will still be rooted at init.

The rootmon tree can be entered via process identifier (PID) lookup (such as via a linked list or a hash list) or traversed from "init" downwards. Since enforcement is most often done upon creation of a child then traversal is typically bottom up.

Figure 14:
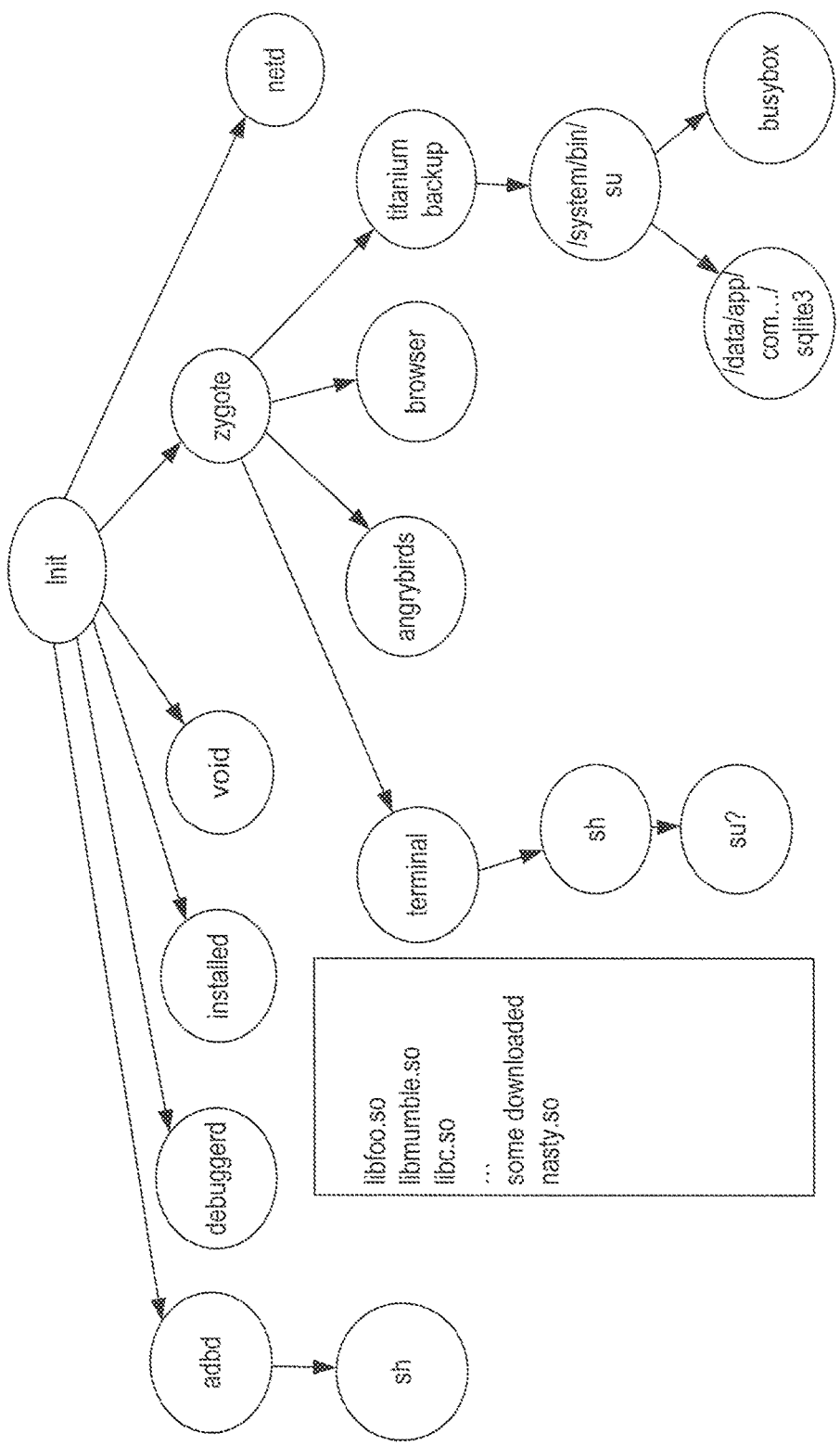
FIG. 14 depicts an active process tree in one embodiment of the invention.

FIG. 14 is representative of an active process tree (e.g., "rootmon" tree), but is not exhaustive. Nodes under zygote are actually represented in memory as a linked list of pointers to child nodes (ie., a node in the tree does not have a variable number of pointers to children but rather a pointer to a linked list of pointers to children). Each node of the tree maintains a reference count. The reference count is incremented for each child process as well as +1 if the corresponding process exists.

For the Android operating system, applications generally do not initially run as root. They may attain root via execution of a setuid binary (alternate paths could achieve root but preventing that might mean additional steps to enforce RPC boundaries). An Android application is identified within the tree as being a child directly beneath zygote. Conversely, if zygote is not in the process ancestry, then one can identify that the process is not part of an Android application. For example, that process might be part of another Android system component rather than an application. Multiple file names are associated with an Android application such as the following:

1. Full binary pathname fullpath, obtained by file system traversal for filename parameter of execve. Blockable process context is required since the retrieval function performs file system operations. If filename parameter references a binary via soft link then fullpath will be the fully resolved filename which could be different.
2. Currently executing binary pathname cpn, obtained by call to request_pathname, which obtains executable/binary pathname from VM of calling task.
3. Current executing commandline capn, obtained by call to proc_pid_cmdline. This retrieves the commandline from the VM of calling task. If this is an Android application then capn contains the name of the Android app.

Monitoring root closure is also advantageous. In one embodiment of the invention, rootmon defines root closures through a table. For a given node that should run as root, each of the possible binaries that can run as root under the node are listed. This is done for each level of the tree. In other words, the in-kernel process tree should not have a root process that cannot be traced to a "tree" within the predefined table structure. Android applications <apk> are known in the tree by their apk name, e.g., com.foo.mumble. Binaries are known by their full pathnames although additional tests for binary replacement e.g. with malicious "Trojan" programs may be applied. Table entries for rootmon may contain hashes or other application metadata ("fingerprint" information that can help in identifying an application). Logic flow of the root closure check is as follows:

If current application is not root then determine whether its parent is a system component or Android application. This decision is reached by traversing the process tree and determining whether "app_process" is an ancestor. app_process must be checked before init because all processes have init as an ancestor. Check resulting process and attempted setuid activity against policy.

If current application is root then determine whether this activity is permitted within application or system component context. Check and enforcement of this activity mandates that trees of root application execution be known. The net effect is that only known and authorized-to-run-as root binaries can be executed. For example, a root-shell cannot be initiated unless the shell is authorized to run as root within context of its system or Android application ancestor.

Alternative Tree Use

Since the tree such as is used in rootmon represents an up-to-date image of process activity it could also be used as a structure for storage of methods or other application metadata. This could be done for example if a binary structure needs to be quickly located.

For example, the entire closure of known ".so" loadable modules for a given application or binary can be annotated on the tree. Attempt to load code from an unknown ".so" such as malware or some other unauthorized dynamic payload can be caught via the mmap2( ) function along with checks that assert the nature of the newly mapped section, e.g., "code" or "executable" vs. "data" metadata or other signatures.

Enforcement Mechanism

Among the key aspects of the invention are the strength and the degree of control that it provides for the enforcement of policy-based decisions. Central to this control are the Policy Enforcement Points (PEPs) that are inserted at a low level to intercept higher level calls requesting access to: handset devices and capabilities such as cameras and microphones; as well as resources such as the file system and certain memory elements, as shown schematically in FIG. 1. Embodiments of the invention also encompass a powerful enforcement mechanism for particularly secure enforcement of policy decisions and control of attempted actions that are detected at PEPs.

In one embodiment, aspects of the invention are somewhat analogous to an exception mechanism (see, e.g., Hennessy, J. and Patterson, D. (2011). *Computer Architecture: A Quantitative Approach.* 5$^{th}$ Ed. Morgan Kaufmann.). In computing environments where the invention is used, a function call that attempts to access a PEP-guarded capability is restricted to executing a next CPU instruction that is controlled by the invention. This prevents potential exploits such as buffer overruns and under-runs. By comparison, conventional function calls might otherwise result in return of a branch instruction, potentially with an exploitable address. Therefore, rather than intercept a function call by returning a branch instruction, the enforcement mechanism directly modifies the CPUs program counter (or an equivalent register) to insert a next instruction giving an action consistent with the policy decision. To further enhance security, the inserted post-call code is located in memory at a non-contiguous address to the resource-requesting calling code (analogous to pre-exception code, in the case of an exception handler), and that memory location is generally unknown to the calling code to further reduce the possibility of exploits from attacks on any memory address. One may also further strengthen the enforcement mechanism from attack by not having the inserted next instruction present in accessible memory until the PEP has intercepted the attempted action, so that the instruction cannot be subject to earlier attack. This can be accomplished, for example, by holding instruction(s) for the enforcement mechanism in an area of protected memory, and by encrypting the instruction(s) to prevent attack.

Testing for VPN Presence—"IP Beacon"

One area of interest in mobile computing is that of Virtual Private Networks (VPNs; see, e.g., Andrew, Tanenbaum, A. and Wtherall, D. (2010). *Computer Networks*. 5th Ed. Prentice Hall.). VPNs make use of public networks such as the internet to make remote private networks seamlessly, yet securely, available to remote users, and to couple disparate remote networks together securely using one or more public wide area networks (WANs). Typically, tunneling technology and encryption is used over the WAN to prevent unwanted access to the VPN and to protect communicated content from being read by undesired third parties. Once a VPN connection is established, use of it is transparent to the connected machines; private network services are visible and available for the most part as if the machines and networks, that are physically remote from each other, are apparently on the same Local Area Network (LAN), typically using the internet protocol (IP) for network data transport and traffic management. It is important to be able to test for the operability and visibility of a particular VPN.

In one embodiment, such testing may be provided by first making available certain service(s), such as service that responds to pings at a known network address on the VPN, and then testing for those service(s) from a remote machine. One can the utilize simple environmental state variables on both the remote machine and elsewhere on the network such as on the test host machine, to represent the state of the VPN (such as its presence or absence) as well as the operational state of specific services, for use in policy-based decisions. This service may be termed an "IP Beacon". In some alternate cases, it may be helpful to have such testable services hosted on the remote machine itself, and tested for from elsewhere on the host network.

File System Controls

The policy-based device management invention provides for particularly granular control of the file system and of individual files that may be available to the handset. The following specific cases of file system control are contemplated within the invention, but the invention is not limited to these specific cases. Variations will become apparent by way of these examples. In the following, a person having privileges allowing the creation and editing of policy content and the management of policies (such management may include actions such as policy activation and deactivation, and potentially, relative policy precedence ranking) is defined as a Policy Administrator (PA).

Case 1: Granular management of files, at provisioning. This is done for a set of files that may be provisioned with the handset, for example prior to the user receiving the handset for use, or during an upgrade, or during other basal reconfiguration of the handset by an administrative party.

Step 1: PA reviews a list of files to be installed on the device.
Step 2: PA "tags" individual files/folders as "Protected".
Step 3: PA writes a policy to allow or deny access to protected files/folders only in specific conditions. One policy condition would be a time period, for example, between 8 am and 6 pm daily. The following is a non-limiting list of some of the conditions that could be utilized individually or as a subset in any logical combination together (either "and" and "or", as specified in the policy):

the time must be in a specific interval, or be before or after a specific time of day
the date must be in a specific range, or be before or after a specific date
the handset must be at or near a specified location
the handset must be sufficiently distant from (at a minimum distance from) specific location(s)
the handset be connected (or not connected) to specific networks
specific handset wireless or wired networking capabilities, such as 802.11 wireless or BLUETOOTH®, are disabled or enabled
the user has been identified as a specific user or as a member of a specified group.

Case 2: A third party is able to "tag" or otherwise denote a file as belonging to a specific application (such as a photograph editor) before sending it to the user of the device. The third party may be an "attested" one, having an established degree of trust to the PA.

Step 1: An application author writes an application that tags data in a known way.
Step 2: The PA writes a policy that limits the access to files or directories related to the specific application or otherwise tagged as belonging to that application, only in specific conditions. One policy condition would be a time period, for example, between 8 am and 6 pm daily. The following is a non-limiting list of some of the conditions that could be utilized individually or in logical combination (either "and" and "or", as specified in the policy):

the time must be in a specific interval, or be before or after a specific time of day
the date must be in a specific range, or be before or after a specific date
the handset must be at or near a specified location
the handset must be sufficiently distant from (at a minimum distance from) specific location(s)
the handset be connected, or not connected, to specific networks
specific handset wireless or wired networking capabilities, such as 802.11 wireless or BLUETOOTH®, are disabled or enabled
the user has been identified as a specific user or as a member of a specified group.

Step 3: The user is allowed or denied access to the appropriate files as specified in the policy of Step 2.

In the example of Step 2, the result is that the device user will be denied or allowed (depending on the policy) access to the files of Step 2 outside of 8 am—6 pm. More granular file access control, such as read-only access, may also be specified in the policy, and subsequently enforced by the invention.

Case 3: The device is provisioned with a subdirectory (a "secure bucket") and access to files in this secure bucket are managed by policy.

Step 1: Application author writes an application that stores files in a particular subdirectory (the "secure bucket").
Step 2: The PA writes a policy that limits the access to files in the secure bucket only in specific conditions. One policy condition would be a time period, for example, between 8 am and 6 pm daily. The following is non-limiting list of some of the conditions that could be utilized individually or in logical combination (either "and" and "or", as specified in the policy):
  the time must be in a specific interval, or be before or after a specific time of day
  the date must be in a specific range, or be before or after a specific date
  the handset must be at or near a specified location
  the handset must be sufficiently distant from (at a minimum distance from) specific location(s)
  the handset be connected, or not connected, to specific networks
  specific handset wireless or wired networking capabilities, such as 802.11 wireless or BLUETOOTH®, are disabled or enabled
  the user has been identified as a specific user or as a member of a specified group.
Step 3: The user is allowed or denied access to files in the secure bucket, as specified in the policy of Step 2. More specific access control, such as read-only or write-only access, may also be specified in the policy, and subsequently enforced by the invention.

Case 4: PA selects classes of files, and then controls access to these classes of files through policy. As one example, a PA may log into a user interface such as a web interface and use a drop down menu to select classes of files. Such classes may include:
  Class 1: Emails linked to a particular account
  Class 2: Files/data linked to a particular application
  Class 3: Files stored in a particular subdirectory
  Class 4: File type or file content type The PA is then able to write specific policies for those file classes that limit availability and/or access to the file classes in specific conditions. One policy condition would be a time period, for example, between 8 am and 6 pm daily. The following is non-limiting list of some of the conditions that could be utilized individually or in logical combination (either "and" and "or", as specified in the policy):
  the time must be in a specific interval, or be before or after a specific time of day
  the date must be in a specific range, or be before or after a specific date
  the handset must be at or near a specified location
  the handset must be sufficiently distant from (at a minimum distance from) specific location(s)
  the handset be connected, or not connected, to specific networks
  specific handset wireless or wired networking capabilities, such as 802.11 wireless or BLUETOOTH®, are disabled or enabled
  the user has been identified as a specific user or as a member of a specified group.

The user is then allowed or denied access to files that are in the PA-selected classes, as specified in a policy. More specific access control, such as read-only access, may also be specified in the policy, and subsequently enforced by the invention.

Case 5: All files created on the device are "tagged" or otherwise labelled or marked with the following information (metadata), when they are created, or at some other time:
  Application that created the file
  Persona or other characteristics of a handset user or use case profile or usage type, such as that of a business user
  An identifier from a third party
  Any other specific metadata that can be used in policy authoring The PA is then able to write policy that limits access to files based on this information and specific conditions. For example, a policy may specify that files associated with the business persona may not be accessed on weekends. The following is a non-limiting list of some of the conditions that could be utilized individually or in logical combination (either "and" and "or", as specified in the policy):
  the time must be in a specific interval, or be before or after a specific time of day
  the date must be in a specific range, or be before or after a specific date
  the handset must be at or near a specified location
  the handset must be sufficiently distant from (at a minimum distance from) specific location(s)
  the handset be connected, or not connected, to specific networks
  specific handset wireless or wired networking capabilities, such as 802.11 wireless or BLUETOOTH®, are disabled or enabled
  the user has been identified as a specific user or as a member of a specified group.

The user is allowed or denied access to files having applicable tags, according to the specified policy and the conditions within it.

The PDP Craft Interface

Figure 15:
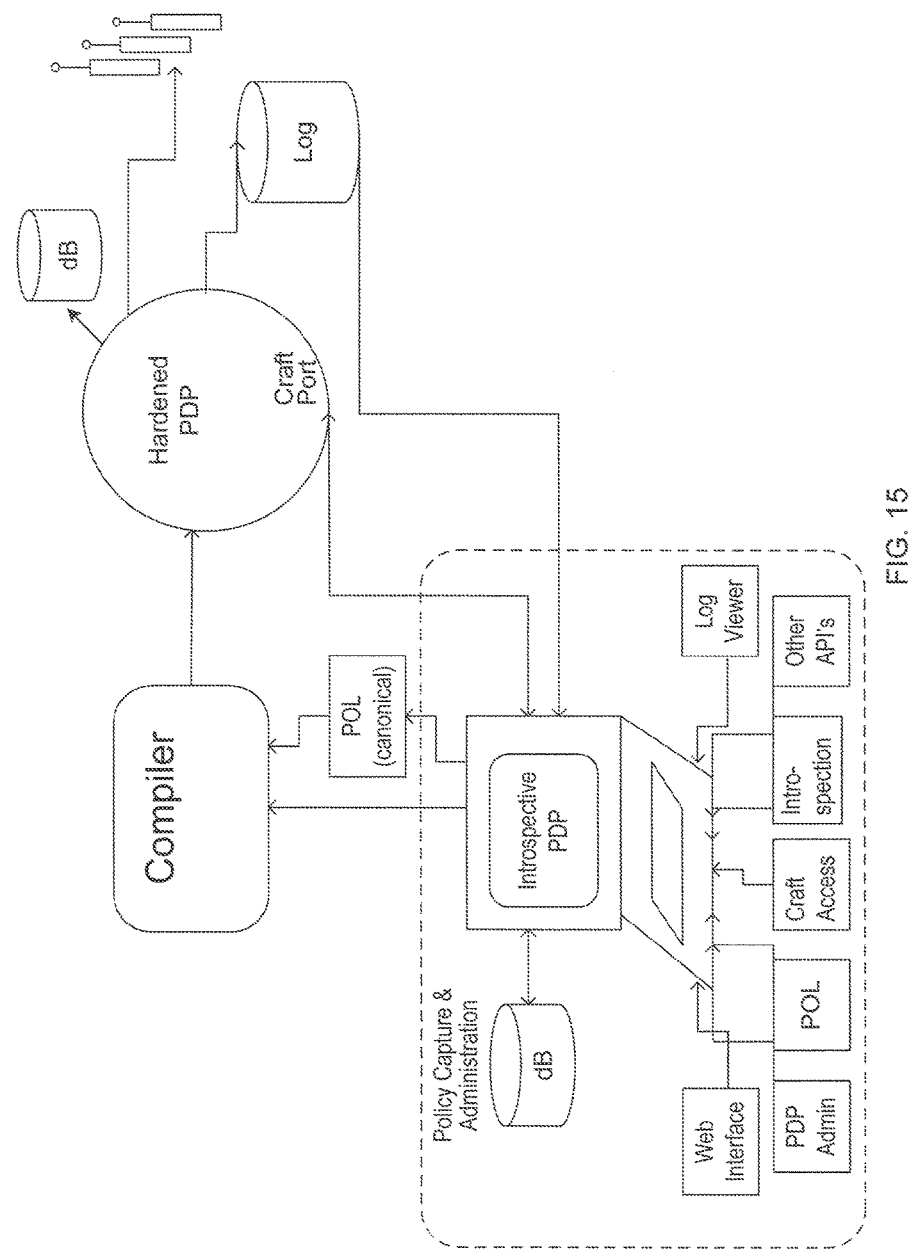
FIG. 15 is a schematic representation of one embodiment of the invention including enhancements such as the addition of a Craft Port.

It may occasionally be desirable to modify the operating parameters of a Hardened PDP during its operation. For this purpose, the invention can incorporate a "Craft Interface" or "Craft Port". This interface has the explicit role of permitting controlled modification of the operating parameters of such a PDP, while it is operating within the network. The Craft Interface is shown schematically in the invention in FIG. 15. The Craft Interface has enough capability to permit an operator, in certain situations, under policy control, to react to urgent situations and make simple operational changes during runtime, quickly and typically without the need for editing POL, recompiling the PDP image and repopulating a PDP server facility or "farm". The Craft Interface may be used to modify some aspects of query processing. However, its main impact is on the control and conditioning of responses to handsets. It is important to note that the Craft Interface generally cannot modify policy; only tag data and certain PDP operating parameters may be altered via the Craft Interface. A variety of ways can be provided to access the Craft Interface, such as the use of a command file that can be ingested by secure means.

By way of non-limiting example, a PA could use the Craft Interface to change logging levels for the purpose of increasing log detail for debugging purposes, or to add handsets to lists of managed handsets, or to add specification of a new malicious executable programs to a "blacklist" of disallowed applications immediate when such threats are discovered.

Dynamic Vector Use in Querying of Policy Decision Point

In the invention, client mobile handsets request policy decisions by sending queries to PDPs in certain circumstances, such as when an attempt to perform a specific action is detected, such as an attempt to use the microphone, or an attempt to install an application. The queries contain information about the detected attempted action and may also contain other relevant contextual information such as estimated location or connectivity to specific networks, and this information is transmitted in the form of a vector of character strings termed a "dynamic vector". Each element or "dynamic" of the vector expresses the state or value of some key descriptor such as a handset identifier (e.g. IMEI) or other relevant information. Such information may include, but is not restricted to:

Handset IMEI or other handset identifying information
Connectivity status
Network type
Handset location
Handset local time
Application name of candidate application for installation
Hash or other unique identifier of candidate application for installation
Application name of candidate application for execution
Hash or other unique identifier of candidate application for execution
User name or other user-identifying information
Target phone number of attempted phone call
Target phone number for attempted SMS transmission where each "dynamic" will typically include one such information element.

The use of such a dynamic vector gives us considerable flexibility in communicating essential information from handset to PDP, while allowing us to eliminate non-essential information from any given query.

The elements contained in a query are aligned with the policy specification statement that follows a Subject-Agent-Object-Action-Environmental model (SAOAE). When the client mobile handset requests policy decisions, the query may include data about the Subject or device where the action has been detected, the application or executable that performs an Action on an Object on behalf of a Subject, the Object upon which a defined action or activity has been performed, the attempted Action which will be allowed or denied, and any Environmental data pertaining to the query.

The elements included in a given query depend on the type of event detected on the device. For example, the query elements when the event is an incoming voice call are different than when the event is an application attempting to execute, or when a program is attempting to use the camera. This approach enables visibility of events occurring on the mobile device, and permits a flexible policy design. Having visibility of occurring events, and under which circumstances such events are occurring, the creation of policies with wide scope in the organization, or policies tailored to the protection of specific aspects of a type of event on the mobile device are possible. (For example, a policy with wide scope could enforce that in a protected physical location the use of the camera is not allowed. Example of more specific policy: an application can be executed only under authorized circumstances, by a specific device user or group of device users.)

When the PDP receives the query from the client mobile handset, it evaluates the query data to provide a policy decision.

Aspects of Policy and Policy Set Validation

In one embodiment, the invention makes use of a Policy Object Language (POL), with a compiler that makes it possible to generate policy servers for the control of access to the resources embodied in mobile devices. The compiler and the introspective PDP facilitate the writing of policies organized into policy sets and these policy sets are embedded in a hierarchical tree of ownership, which reflects the order of the policy owners for authority-precedence purposes.

One of the rigid requirements on the invention is that a query from a mobile, which takes the form of a packet containing variable values (dynamics), should only elicit a response from a single policy or none at all, in which case the policy server returns a default response. However, the decision process involves the evaluation of complex conditional expressions that are the essence of the content of a policy definition and these conditionals make heavy use of tag expressions, which define relations on the dynamic values and on the tags themselves. In tag expressions, the symbol "→" expresses tag relations wherein the entity on the arrowhead side of → is a tag on the entity on the other side of →. For example, X→Y, expresses that Y is a tag on X. By further example, if SubjectIMEI is an incoming unique dynamic identifying the mobile device, the server may have subsequent tags that can be put into an expression, forming a hierarchy of tags. A non-limiting example of such a hierarchical tag expression would be:

SubjectIMEI→OwnerCompanyID→Department→Role

Such a tag expression may then be used as a comparand in a conditional expression in a policy.

For example, one such conditional expression could be:

SubjectIMEI→OwnerCompanyID→Department→Role==Supervisor and another tag-based conditional expression example is SubjectIMEI→enterprise_employee==true Policies may have a multitude of conditionals qualifying different aspects of a query, any of which may rely on the same dynamics, tagged in different ways. So while it may in some cases be simple to write an individual policy, it is difficult and time-consuming to determine the values of the dynamics that will actually cause a policy to be selected, if there is even any policy selected. The problem becomes more challenging at a practical scale, considering that a real policy database may have a thousand or more policies.

An organization cannot be expected to entrust its mobile communications to a policy environment whose validity had not been thoroughly examined. The following are among the reasons for this:

a simple bug could constitute an unwitting denial-of-service, or cause other apparent system malfunctions and/or incorrect query responses multiple policies selected for the same query could leave the system in a non-deterministic state the policies of "senior" policy owners could unwittingly mask the policies of junior policy owners, rendering their control of aspects of the mobile communication unworkable Furthermore, a manual approach to policy validation, such using individuals pressing buttons on their mobile devices, has neither the testing bandwidth, the situational coverage nor the methodological completeness to represent a satisfactory validation scheme for the impact of the policy collection on mobile communication. What is required is a robust process, herein termed a "Sanity Checker", for validating the coherence and the safety of the policy collection that constitutes a PDP.

The Sanity Checker must address the following specific issues for any given policy collection:

1. Are we doing the right thing (AWDTRT)? Independently of the operational features of the PDP, do the given policies satisfy certain safety and operating criteria? Specifically, the following questions are considered:

a. Is there a set of dynamic values for each policy that will cause that policy to be selected in the absence of an over-riding policy?

b. For any given set of dynamic values, is it possible that two or more distinct policies, of the same rank in the tree, will be selected, causing an ambiguous decision?

c. For each policy, is there a set of dynamic values that will cause it to be selected without being overridden by a policy belonging to some "senior" policy owner?

2. Are we doing the thing right (AWDTTR)? Once confidence is established in the self-coherence and logical validity of a set of policies, can it be verified that an actual PDP (operational or introspective) will produce decisions that are the same as those predicted by the logic of the policy collection, as verified above?

In certain embodiments of the invention, the following alternate approaches for implementing such a Sanity Checker can be implemented:

1. Sanity-checking can be handled, for example, by having the compiler issue a description of the policy space as a set of Horn Clauses and using the Prolog unification and search mechanisms to answer all the AWDTRT questions (see Brna, P. (2001, Mar. 5). *Prolog Programming: A First Course*. Retrieved from <http://homepages.inf.ed.ac.uk/pbrna/prologbook/> on Mar. 16, 2013). The generation of test patterns for answering the AWDTTR questions is a side effect of this approach.

2. As an alternate, sanity-checking algorithm, the conditional tag-expressions are scanned in reverse, and sets of values can be determined for each of the dynamics that are relevant to reaching the decision. The answers to the AWDTRT questions reduce to determining whether the value sets are empty and whether the intersections of value sets are empty—and, if not, the values in the intersections are those that will cause the ambiguities etc., so that errors and warnings can be issued.

Aspects of Query Response and Policy Processing for Performance Optimization

For any given query from a handset managed by the invention, there may be a multitude of potentially applicable policies that could be considered, in computing the appropriate response to the query, where such a response will be typically to allow or deny the attempted action that resulted in the query. The subset of such policies may be large, and the policies and the policy hierarchy can be very complex, with possibly hundreds or thousands of policies in a given policy set. Fast response to any given query is advantageous. One of the ways by which a fast response can be ensured is through an efficient selection algorithm for:

1. Choosing candidate applicable policies from a policy set; and
2. Determining, from these candidate policies, which policy to use in computing the correct response to the query.

Furthermore, policies for use in the invention can be stored in an SQL database, in which case a fast response can be encouraged by limiting each query to one database access. One way this can be accomplished is by associating one or more tag-expressions, called 'discriminants', with each policy, and thence using these discriminants in policy selection.

Figure 16:
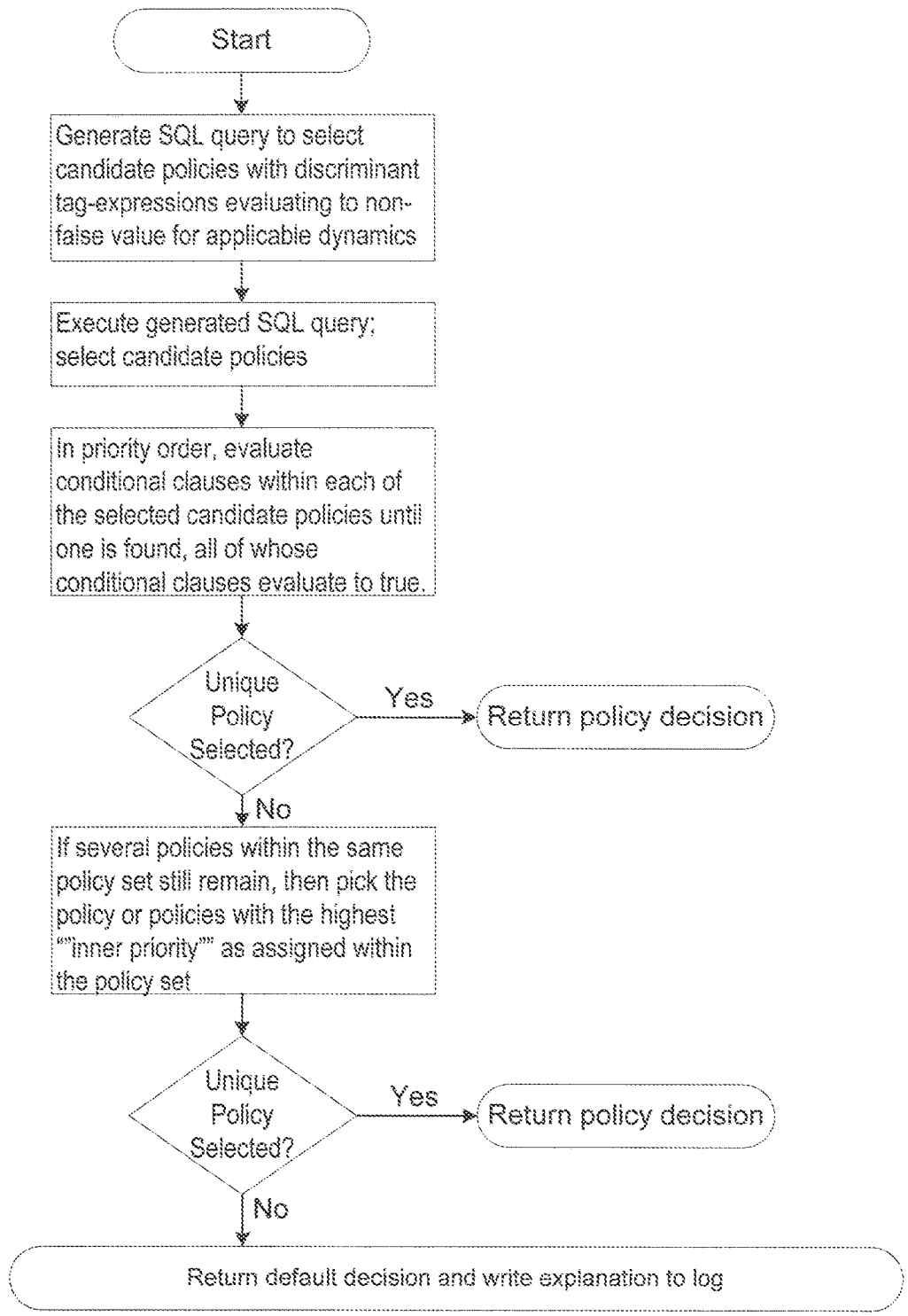
FIG. 16 is a representation of an algorithm used in the invention for query performance optimization for efficient policy selection in one embodiment of the invention.

In one embodiment, the policy selection algorithm typically uses the following steps, and is depicted in FIG. 16:

Generate and execute an SQL query to select those candidate policies whose discriminant tag-expressions evaluate to a non-false value for the dynamics in the query.

Following the priority ordering on the policy sets, evaluate conditional clauses within each of the selected candidate policies until one is found, all of whose conditional clauses evaluate to true.

If unique, at that priority level, return the decision parameters defined in the selected policy.

If several policies within the same policy set still remain, then pick the one with the highest "inner priority". Policies may be assigned an "inner priority" that applies within the policy set.

If not unique, or no policy is selected, return a decision that is defined as the default for the PDP and file an explanation in the PDP log file.

As a non-limiting example of the use of the above policy selection algorithm, consider the set of simple policies represented in the following Table 1, along with queries for a specific handset having IMEI of 0123456789123456, that same handset being within a set denoted "Consumer". A query from that handset requesting access to the camera of that handset will result in selection of the "Cam Use 1" policy and subsequent allowed use of the camera. Note that policy "Consumer 4" was not selected, due to it having a lower Inner Priority than policy "Cam Use 1".

As a second non-limiting example of the use of the above policy selection algorithm, consider again the policies represented in Table 1, but in this case with the example handset being in the "Enterprise set". In this case, a query requesting that the handset be allowed access to the website "http://linkedin.com" will result in the selection of policy "Enterprise 3", and subsequent allowed access to that website.

TABLE 1

Representative policy set.

| Policy Name | Policy Set Name | Policy Set Priority | Policy Inner Priority | Discriminant Expression | Policy (heuristic) |
|---|---|---|---|---|---|
| Cam Use 1 | Customer 1 policies | high | high | SubjectIMEI == "0123456789123456" | Allow camera access |
| Consumer 4 | Generic consumer policies | low | low | Handset is in Consumer set | Deny camera access |
| Enterprise 1 | Generic enterprise policies | medium | low | Handset is in Enterprise set | Deny camera access |
| Enterprise 2 | Generic enterprise policies | medium | low | Handset is in Enterprise set | Deny access to sites in social network site list |
| Enterprise 3 | Generic enterprise policies | medium | medium | Handset is in Enterprise set | Allow access to http://linkedin.com |

Techniques for Management and Propagation of PDP Version Updating and Policy Decision Synchronization There are significant considerations for the invention in regard to the staleness or currency of policy decision information that may be cached on handsets within the invention. The following elements of the design are considered:
1. Each PDP is stateless.
2. Policies for decisions are static.
3. A PDP does not push information to handsets at arbitrary times, but only in response to incoming packets from a handset.
4. The handset sends short identifying information sets or "heartbeats" to a PDP regularly to demonstrate its existence and presence in a system, and allow the PDP to respond with necessary information.
5. Each compiled PDP image has a unique version number.

Furthermore, a typical implementation of the invention may incorporate the following details:
1. Packets are sent between PDP and handset via UDP and can be lost in transit. This is as expected when using UDP.
2. The handset uses a decision cache so that decisions can be reused over the duration of validity.
3. The handset automatically flushes its decision cache if it receives a packet from a PDP with a different version number than the last one.
4. A PDP only responds to heartbeats when there is an applicable out of band (OOB) command for the device.
5. A PDP keeps sending heartbeat responses for as long as there are applicable out of band (OOB) commands for the handset.
6. There are two types of OOB commands: one-shot and continuous.
7. One-shot OOB commands are executed only once. Continuous ones are applied for the time that they continue to show up in heartbeat responses.
8. Because packets may be dropped, the handset waits for a heartbeat response that no longer contains continuous OOB commands before it stops applying the latter.

The above design elements and implementation details present the following problems for the invention in actual use:
1. When the PDP changes (and thus the policies change), the handset may not find out about the changes for a period of time, if a version of the decisions it needs is cached and the PDP doesn't have applicable OOB commands for it to invoke a heartbeat response. If unresolved, this problem can lead to out-of-date, and potentially incorrect, decisions being enforced on the handset.
2. When all of the continuous OOB commands for a handset are removed, possibly via the Craft Interface described previously, the PDP no longer responds to heartbeats, so a handset doesn't get confirmation that the OOB commands are to stop being applied.

However, the following solutions can be utilized within the invention for these two problems:
The following 4 solutions or combinations thereof may be used to solve problem 1:
1. Automatically add a one-shot OOB command to flush the cache (to be sent to each handset) to each PDP as it is generated. This ensures that there will be a heartbeat response to each handset and that the cache will be flushed then.
2. Automatically respond to all heartbeats, even when there are no applicable OOB commands for the handset. The handset will automatically flush its cache when it sees that the PDP version number has changed in the heartbeat response packet. This is similar to solution 1, except that no OOB needs to be automatically added to each PDP.
3. Have the handset include the PDP version number that it last saw as a dynamic in its heartbeats. The PDP can then detect that the version number is different, and send back an appropriate response at that time, even if there are no applicable OOB commands. This has the advantage that the PDP no longer has to respond to every heartbeat.
4. As a refinement to solution 3, rather than include the PDP version number in every heartbeat, the PDP version number can be used as an optional dynamic, and the handset can send the PDP version number to the PDP only when the cache is populated with valid decisions. If there is nothing in the cache, the PEP does not send the PDP version number. If the PDP sees this dynamic and the PDP version number has a different version, then it sends the OOB command. This has the advantage that if there is nothing in the device agent cache, no response from the PDP is expected. Also, the PDP will not send commands to flush the cache when there is no need to do it.

The following 3 solutions may each be used to solve problem 2:
1. The handset can stop applying continuous OOB commands as soon as it doesn't get a response with those same commands. This will work even when the PDP stops responding to heartbeats when it doesn't have any applicable OOBs.
2. As a variant on solution 1, rather than stop applying continuous OOB commands immediately on the first non-response from the PDP, the handset agent software stops applying continuous OOB commands after 3 heartbeats (or some other small, predefined number of heartbeats that do not receive a response, or after some predetermined non-response time. This reduces the probability that a command be suspended due to a network issue or some other issue not related to an intentional cessation of OOB commands.
3. Have the PDP respond to all heartbeats whether or not there are applicable OOB commands for the handset. Thus, the handset will know that it is supposed to stop applying the continuous OOB commands when a heartbeat response packet shows up without them.

It is notable that solution 2 for both problems is the same, that being to have the PDP respond to all heartbeats all the time. This is a simple solution, but increases the traffic between handset and PDP. However, the rate at which heartbeats are sent can be set to some low number e.g. one per hour or less, so as to keep such traffic low.

INDUSTRIAL APPLICABILITY

The invention pertains to securing mobile devices and any industry where that may be of value or importance.

What is claimed is:
1. A system for hiding the adjudication for authorizing a client access request to a secure computing device resource, the system having hidden secure policy instructions, a hidden secure adjudication process and hidden secure condition and parameters for hidden permitted operations on the requested secure computing resource device, the system comprising:
a hardened and hidden policy decision server having a secure persistent memory for storing hierarchical sets of policy instructions and parameters, and having a processor for applying at least one set of the hierarchical sets of policy instructions and parameters to the client access request and computing an adjudicated decision of authorized access or denial of access based on hidden permitted operations on the requested secure computing device resource;

an encrypted back-channel for communicating the client access request to the policy decision server and for hiding the policy instructions, the adjudication process, and the conditions and parameters utilized by the processor in adjudicating the client access requests from the requesting client;

an agent, hidden from the requesting client and coupled to the policy decision server by the encrypted back-channel for transmitting client access requests, including additional parameters needed to access the secure computing device resource as required by the policy instructions, to the policy decision server; and a policy enforcement server coupled to the agent for receiving adjudicated decisions from the policy decision server, secure computing device resource and having an intercepting server for intercepting client access requests, said policy enforcement server being coupled to the agent for transmitting the access requests thereto, and for receiving and transmitting policy decisions to the agent and for enforcing the adjudicated decision received from the agent.

2. The system of claim 1, wherein the policy decision subsystem may securely modify, add or delete policy instructions.

3. The system of claim 1, wherein the policy decision subsystem is resident on a different computing device apart from the policy enforcement subsystem.

4. The system of claim 1 wherein policy instructions are expressed in a policy object language, the system further including:

a policy compiler and code generator for compiling policy instructions written in the policy object language into executable code; and an interface to transmit the policy instructions in executable code form produced by the policy compiler and code generator to the policy decision server.

5. The system of claim 1, wherein the policy enforcement subsystem further includes a modification server for modifying a processing unit program counter, program register, machine instructions, or a functionally equivalent register to control subsequent actions following an allowance decision from the policy decision server.

6. A method for hiding the adjudication of client access to a secure computing device resource, having secure policy instructions for permitted operations on the requested resource, comprising the steps of:

securely intercepting a client access request to access the computing device resource to which the client has no access and transmitting the client access request to an agent;

transmitting the intercepted client access request to a policy decision server via an encrypted back-channel from the agent to a persistent memory;

transmitting policy instructions and parameters from the persistent memory to the policy-decision server via the encrypted back-channel;

transmitting a request for additional parameters as required by the policy instructions from the policy decision server to the agent via the encrypted back-channel;

transmitting the additional parameters needed to access the requested resource required by the policy instructions from the agent to the policy decision serve via the encrypted back-channel;

adjudicating the client access request at the policy decision server using the policy instructions for permitted operations on the requested resource;

transmitting to the agent via the encrypted back-channel the adjudicated decision to allow or deny access by the client to the requested resource;

enforcing the adjudicated decision received from the agent; and transmitting the adjudicated decision to the requesting client via the agent.

7. The method of claim 6 wherein the policy decision server modifies, adds, or deletes policy instructions.

8. The method of claim 6 further including the steps of:

expressing the policy instructions in a policy object language;

compiling the policy instructions expressed in the policy object language into executable code; and transmitting by secure encrypted back-channel the policy instructions in executable code form to the policy decision server.

9. The method of claim 6 wherein the policy enforcement server further includes modifying a processing unit program counter, program register, machine instructions, or a functionally equivalent register to control subsequent actions following an allowance decision from the policy decision server.

* * * * *